(12) United States Patent
Hannuksela

(10) Patent No.: US 10,334,260 B2
(45) Date of Patent: Jun. 25, 2019

(54) APPARATUS, A METHOD AND A COMPUTER PROGRAM FOR VIDEO CODING AND DECODING

(71) Applicant: Nokia Technologies Oy, Espoo (FI)

(72) Inventor: Miska Matias Hannuksela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/659,131

(22) Filed: Mar. 16, 2015

(65) Prior Publication Data

US 2015/0312580 A1 Oct. 29, 2015

Related U.S. Application Data

(60) Provisional application No. 61/954,306, filed on Mar. 17, 2014.

(51) Int. Cl.
*H04N 19/31* (2014.01)
*H04N 19/46* (2014.01)
(Continued)

(52) U.S. Cl.
CPC ......... *H04N 19/31* (2014.11); *H04N 19/172* (2014.11); *H04N 19/187* (2014.11);
(Continued)

(58) Field of Classification Search
None
See application file for complete search history.

(56) References Cited

U.S. PATENT DOCUMENTS

| 2006/0256851 A1 | 11/2006 | Wang et al. |
| 2007/0110150 A1 | 5/2007 | Wang et al. |

(Continued)

FOREIGN PATENT DOCUMENTS

| KR | 10-2014-0007293 | 1/2014 |
| RU | 2377736 C2 | 12/2009 |

(Continued)

OTHER PUBLICATIONS

"Advanced Video Coding for Generic Audiovisual Services", Series H: Audiovisual and Multimedia Systems, Infrastructure of audiovisual services—Coding of moving video, Recommendation ITU-T H.264, Mar. 2010, 676 pages.

(Continued)

*Primary Examiner* — William C Vaughn, Jr.
*Assistant Examiner* — Lindsay J Uhl
(74) *Attorney, Agent, or Firm* — Alston & Bird LLP

(57) ABSTRACT

A method comprising: encoding a first picture on a first scalability layer and on a lowest temporal sub-layer; encoding a second picture on a second scalability layer and on the lowest temporal sub-layer, wherein the first picture and the second picture represent the same time instant, encoding one or more first syntax elements, associated with the first picture, with a value indicating that a picture type of the first picture is other than a step-wise temporal sub-layer access (STSA) picture; encoding one or more second syntax elements, associated with the second picture, with a value indicating that a picture type of the second picture is a step-wise temporal sub-layer access picture; and encoding at least a third picture on a second scalability layer and on a temporal sub-layer higher than the lowest temporal sub-layer.

14 Claims, 18 Drawing Sheets

(51) Int. Cl.
    H04N 19/70    (2014.01)
    H04N 19/172   (2014.01)
    H04N 19/187   (2014.01)
    H04N 19/433   (2014.01)
(52) U.S. Cl.
    CPC ........... *H04N 19/433* (2014.11); *H04N 19/46* (2014.11); *H04N 19/70* (2014.11)

(56) References Cited

U.S. PATENT DOCUMENTS

| | | | |
|---|---|---|---|
| 2009/0003439 A1 | 1/2009 | Wang et al. | |
| 2014/0086333 A1* | 3/2014 | Wang | H04N 19/70 375/240.25 |
| 2014/0301437 A1* | 10/2014 | Wang | H04N 19/70 375/240.02 |
| 2015/0215632 A1* | 7/2015 | Choi | H04N 19/30 375/240.16 |
| 2016/0088306 A1* | 3/2016 | Sjoberg | H04N 19/187 375/240.02 |
| 2016/0269740 A1* | 9/2016 | Choi | H04N 19/70 |

FOREIGN PATENT DOCUMENTS

| | | |
|---|---|---|
| WO | 2009/001313 A3 | 12/2008 |
| WO | WO 2013/109178 A1 | 7/2013 |
| WO | 2014/002469 A1 | 1/2014 |

OTHER PUBLICATIONS

"High Efficiency Video Coding", Series H: Audiovisual and Multimedia Systems, Infrastructure of audiovisual services—Coding of moving video, Recommendation ITU-T H.265, Apr. 2013, 317 pages.

"Parameter Values for Ultra-High Definition Television Systems for Production and International Programme Exchange", Recommendation ITU-R BT.2020, Aug. 2012, 7 pages.

"Parameter Values for the HDTV Standards for Production and International Programme Exchange", Recommendation ITU-R BT.709-5, Apr. 2002, 32 pages.

"Applications and Requirements for Scalable Video Coding", ISO/IEC JTC1/SC29/WG11/N5540, Requirements v.2, Mar. 2003, pp. 1-14.

"Information Technology—Coding of Audio-Visual Objects—Part 12: ISO Base Media File Format", ISO/IEC 14496-12, Third edition, Oct. 15, 2008, 120 pages.

"Information Technology—Coding of Audio-Visual Objects—Part 14: MP4 File Format", ISO/IEC14496-14, First edition, Nov. 15, 2003, 18 pages.

"Information Technology—Coding of Audio-Visual Objects—Part 15: Advanced Video Coding (AVC) File Format", ISO/IEC 14496-15, First edition, Apr. 15, 2004, 29 pages.

"3rd Generation Partnership Project; Technical Specification Group Services and System Aspects; Transparent end-to-end packet switched streaming service (PSS);3GPP file format (3GP) (Release 13)", 3GPP TS 26.244, v13.0.0, Dec. 2014, 64 pages.

International Search Report and Written Opinion received for corresponding Patent Cooperation Treaty Application No. PCT/FI2015/050171, dated May 26, 2015, 15 pages.

Ikai et al., "MV-HEVC/SHVC HLS: Temporal ID Alignment and Inter-Layer Prediction Restriction", Joint Collaborative Team on Video Coding (JCT-VC) of ITU-T SG 16 WP 3 and ISO/IEC JTC 1/SC 29/WG 11, JCTVC-N0060, 14th Meeting, Sharp Corporation, Jul. 25-Aug. 2, 2013, pp. 1-5.

Deshpande, "Adaptive HTTP Streaming Utilizing Temporal Sub-layers of High Efficiency Video Coding (HEVC)", IEEE International Symposium on Multimedia, Dec. 9-11, 2013, pp. 384-390.

Sjoberg et al., "Overview of Hevc High-Level Syntax and Reference Picture Management", IEEE Transactions on Circuits and Systems for Video Technology, vol. 22, No. 12, Dec. 2012, pp. 1858-1870.

Office Action for Russian Application No. 2016138687 dated Nov. 27, 2017, 26 pages total.

Deshpande, *On Gradual Temporal Layer Access*, Joint Collaborative Team on Video Coding (JCT-VC) of ITU-T SG16 WP3 and ISO/IEC JTC1/SC29/WG11, 10th Meeting (Jul. 11-Jul. 20, 2012) JCTVC-J0305; WG11 No. m25633, 5 pages.

Extended European Search Report for corresponding European Application No. 15765714.9 dated Oct. 23, 2017, 11 pages.

Hannuksela et al., *MV-HEVC/SHVC HLS: On TSA and STSA pictures*, Joint Collaborative Team on Video Coding (JCT-VC) of ITU-T SG 16 WP 3 and ISO/IEC JTC 1/SC 29/WG 11, 17th Meeting, (Mar. 27-Apr. 4, 2014) JCTVC-Q0108, JCT3V-H0036, 8 pages.

Wang et al., *MV-HEVC/SHVC HLS: On various cross-layer alignments*, Joint Collaborative Team on Video Coding (JCT-VC) of ITU-T SG 16 WP 3 and ISO/IEC JTC 1/SC 29/WG 11, 14th Meeting (Jul. 25-Aug. 2, 2013) JCTVC-N0084, JCT3V-E0056, 5 pages.

Office Action for corresponding Canadian Application No. 2,942,838 dated Jun. 29, 2017, 3 pages.

Office Action for Canadian Application No. 2,942,838 dated May 14, 2018.

Office Action for Korean Application No. 10-2016-7028702 dated Jan. 21, 2019, 12 pages.

Office Action for Chinese Application No. 2015800245980 dated Dec. 29, 2018, 10 pages.

Office Action for Russian Application No. 2016138687 dated Feb. 26, 2019, 3 pages.

* cited by examiner

APPARATUS, A METHOD AND A COMPUTER PROGRAM FOR VIDEO CODING AND DECODING

TECHNICAL FIELD

The present invention relates to an apparatus, a method and a computer program for video coding and decoding.

BACKGROUND

Scalable video coding refers to coding structure where one bitstream can contain multiple representations of the content at different bitrates, resolutions or frame rates. In these cases the receiver can extract the desired representation depending on its characteristics. Alternatively, a server or a network element can extract the portions of the bitstream to be transmitted to the receiver depending on e.g. the network characteristics or processing capabilities of the receiver. A scalable bitstream typically consists of a base layer providing the lowest quality video available and one or more enhancement layers that enhance the video quality when received and decoded together with the lower layers. In order to improve coding efficiency for the enhancement layers, the coded representation of that layer typically depends on the lower layers.

A coding standard or system may refer to a term operation point or alike, which may indicate the scalable layers and/or sub-layers under which the decoding operates and/or may be associated with a sub-bitstream that includes the scalable layers and/or sub-layers being decoded.

In SHVC (Scalable extension to H.265/HEVC) and MV-HEVC (Multiview extension to H.265/HEVC), an operation point definition may include a consideration a target output layer set. In SHVC and MV-HEVC, an operation point may be defined as a bitstream that is created from another bitstream by operation of the sub-bitstream extraction process with the another bitstream, a target highest temporal level, and a target layer identifier list as inputs, and that is associated with a set of target output layers.

However, the scalability designs in the contemporary state of various video coding standards have some limitations. For example, in SHVC, pictures of an access unit are required to have the same temporal level. This disables encoders to determine prediction hierarchies differently across layers, thus limiting the possibilities to use frequent sub-layer up-switch points and/or to achieve a better rate-distortion performance. Moreover, a further limitation is that temporal level switch pictures are not allowed at the lowest temporal level. This disables to indicate an access picture or access point to a layer that enables decoding of some temporal levels (but not necessarily all of them).

SUMMARY

Now in order to at least alleviate the above problems, methods for encoding and decoding restricted layer access pictures are introduced herein.

A method according to a first embodiment comprises
receiving coded pictures of a first scalability layer;
decoding the coded pictures of the first scalability layer;
receiving coded pictures of a second scalability layer, the second scalability layer depending on the first scalability layer;
selecting a layer access picture on the second scalability layer from the coded pictures of a second scalability layer, wherein the selected layer access picture is a step-wise temporal sub-layer access picture on a lowest temporal sub-layer;
ignoring coded pictures on a second scalability layer prior to, in decoding order, the selected layer access picture;
decoding the selected layer access picture.

According to an embodiment, the step-wise temporal sub-layer access picture provides an access point for layer-wise initialization of decoding of a bitstream with one or more temporal sub-layers.

According to an embodiment, the step-wise temporal sub-layer access picture provides an access point for layer-wise bitrate adaptation of a bitstream with one or more temporal layers.

According to an embodiment, the method further comprises
receiving an indication about the step-wise temporal sub-layer access picture in a specific NAL unit type provided along the bitstream.

According to an embodiment, the method further comprises
receiving an indication about the step-wise temporal sub-layer access picture with an SEI message defining the number of decodable sub-layers.

According to an embodiment, the method further comprises
starting decoding of the bitstream in response to a base layer containing an intra random access point (IRAP) picture or a step-wise temporal sub-layer access (STSA) picture on the lowest sub-layer;
starting step-wise decoding of at least one enhancement layer in response to said at least one enhancement layer containing an IRAP picture or an STSA picture on the lowest sub-layer; and
increasing progressively the number of decoded layers and/or the number of decoded temporal sub-layers.

According to an embodiment, the method further comprises
generating unavailable pictures for reference pictures of a first picture in decoding order in a particular enhancement layer.

According to an embodiment, the method further comprises
omitting the decoding of pictures preceding the IRAP picture from which the decoding of a particular enhancement layer can be started.

According to an embodiment, the method further comprises
labeling said omitted pictures by one or more specific NAL unit types.

According to an embodiment, the method further comprises
maintaining information which sub-layers of each layer have been correctly decoded.

According to an embodiment, starting the step-wise decoding comprises one or more of the following conditional operations:
when a current picture is an IRAP picture and decoding of all reference layers of the IRAP picture has been started, the IRAP picture and all pictures following it, in decoding order, in the same layer are decoded.
when the current picture is an STSA picture at the lowest sub-layer and decoding of the lowest sub-layer of all reference layers of the STSA picture has been started, the STSA picture and all pictures at the lowest sub-layer following the STSA picture, in decoding order, in the same layer are decoded.

when the current picture is a TSA or STSA picture at a higher sub-layer than the lowest sub-layer and decoding of the next lower sub-layer in the same layer has been started, and decoding of the same sub-layer of all the reference layers of the TSA or STSA picture has been started, the TSA or STSA picture and all pictures at the same sub-layer following the TSA or STSA picture, in decoding order, in the same layer are decoded.

A method according to a second embodiment comprises
receiving coded pictures of a first scalability layer;
receiving coded pictures of a second scalability layer, the second scalability layer depending on the first scalability layer;
selecting a layer access picture on the second scalability layer from the coded pictures of a second scalability layer, wherein the selected layer access picture is a step-wise temporal sub-layer access picture on the lowest temporal sub-layer;
ignoring coded pictures on a second scalability layer prior to, in decoding order, the selected layer access picture;
sending the coded pictures of the first scalability layer and the selected layer access picture in a bitstream.

An apparatus according to a third embodiment comprises:
at least one processor and at least one memory, said at least one memory stored with code thereon, which when executed by said at least one processor, causes an apparatus to perform at least
receiving coded pictures of a first scalability layer;
decoding the coded pictures of the first scalability layer;
receiving coded pictures of a second scalability layer, the second scalability layer depending on the first scalability layer;
selecting a layer access picture on the second scalability layer from the coded pictures of a second scalability layer, wherein the selected layer access picture is a step-wise temporal sub-layer access picture on the lowest temporal sub-layer;
ignoring coded pictures on a second scalability layer prior to, in decoding order, the selected layer access picture;
decoding the selected layer access picture.

An apparatus according to a fourth embodiment comprises:
at least one processor and at least one memory, said at least one memory stored with code thereon, which when executed by said at least one processor, causes an apparatus to perform at least
receiving coded pictures of a first scalability layer;
receiving coded pictures of a second scalability layer, the second scalability layer depending on the first scalability layer;
selecting a layer access picture on the second scalability layer from the coded pictures of a second scalability layer, wherein the selected layer access picture is a step-wise temporal sub-layer access picture on the lowest temporal sub-layer;
ignoring coded pictures on a second scalability layer prior to, in decoding order, the selected layer access picture;
sending the coded pictures of the first scalability layer and the selected layer access picture in a bitstream.

According to a fifth embodiment there is provided a computer readable storage medium stored with code thereon for use by an apparatus, which when executed by a processor, causes the apparatus to perform:
receiving coded pictures of a first scalability layer;
decoding the coded pictures of the first scalability layer;
receiving coded pictures of a second scalability layer, the second scalability layer depending on the first scalability layer;
selecting a layer access picture on the second scalability layer from the coded pictures of a second scalability layer, wherein the selected layer access picture is a step-wise temporal sub-layer access picture on the lowest temporal sub-layer;
ignoring coded pictures on a second scalability layer prior to, in decoding order, the selected layer access picture;
decoding the selected layer access picture.

According to a sixth embodiment there is provided an apparatus comprising a video decoder configured for decoding a bitstream comprising an image sequence, the video decoder comprising
means for receiving coded pictures of a first scalability layer;
means for decoding the coded pictures of the first scalability layer;
means for receiving coded pictures of a second scalability layer, the second scalability layer depending on the first scalability layer;
means for selecting a layer access picture on the second scalability layer from the coded pictures of a second scalability layer, wherein the selected layer access picture is a step-wise temporal sub-layer access picture on the lowest temporal sub-layer;
means for ignoring coded pictures on a second scalability layer prior to, in decoding order, the selected layer access picture;
means for decoding the selected layer access picture.

According to a seventh embodiment there is provided a video decoder configured for decoding a bitstream comprising an image sequence, wherein said video decoder is further configured for:
receiving coded pictures of a first scalability layer;
decoding the coded pictures of the first scalability layer;
receiving coded pictures of a second scalability layer, the second scalability layer depending on the first scalability layer;
selecting a layer access picture on the second scalability layer from the coded pictures of a second scalability layer, wherein the selected layer access picture is a step-wise temporal sub-layer access picture on the lowest temporal sub-layer;
ignoring coded pictures on a second scalability layer prior to, in decoding order, the selected layer access picture;
decoding the selected layer access picture.

A method according to an eighth embodiment comprises
encoding a first picture on a first scalability layer and on a lowest temporal sub-layer;
encoding a second picture on a second scalability layer and on the lowest temporal sub-layer, wherein the first picture and the second picture represent the same time instant,
encoding one or more first syntax elements, associated with the first picture, with a value indicating that a picture type of the first picture is other than a step-wise temporal sub-layer access picture;
encoding one or more second syntax elements, associated with the second picture, with a value indicating that a picture type of the second picture is a step-wise temporal sub-layer access picture; and
encoding at least a third picture on a second scalability layer and on a temporal sub-layer higher than the lowest temporal sub-layer.

According to an embodiment, the step-wise temporal sub-layer access picture provides an access point for layer-wise initialization of decoding of a bitstream with one or more temporal sub-layers.

According to an embodiment, the step-wise temporal sub-layer access picture is an STSA picture with TemporalId equal to 0.

According to an embodiment, the method further comprises signaling the step-wise temporal sub-layer access picture in the bitstream by a specific NAL unit type.

According to an embodiment, the method further comprises signaling the step-wise temporal sub-layer access picture in a SEI message defining the number of decodable sub-layers.

According to an embodiment, the method further comprises encoding said second or any further scalability layer to comprise more frequent TSA or STSA pictures than the first scalability layer.

An apparatus according to a ninth embodiment comprises:

at least one processor and at least one memory, said at least one memory stored with code thereon, which when executed by said at least one processor, causes an apparatus to perform at least encoding a first picture on a first scalability layer and on a lowest temporal sub-layer;

encoding a second picture on a second scalability layer and on the lowest temporal sub-layer, wherein the first picture and the second picture represent the same time instant, encoding one or more first syntax elements, associated with the first picture, with a value indicating that a picture type of the first picture is other than a step-wise temporal sub-layer access picture;

encoding one or more second syntax elements, associated with the second picture, with a value indicating that a picture type of the second picture is a step-wise temporal sub-layer access picture; and encoding at least a third picture on a second scalability layer and on a temporal sub-layer higher than the lowest temporal sub-layer.

According to a tenth embodiment there is provided a computer readable storage medium stored with code thereon for use by an apparatus, which when executed by a processor, causes the apparatus to perform:

encoding a first picture on a first scalability layer and on a lowest temporal sub-layer;

encoding a second picture on a second scalability layer and on the lowest temporal sub-layer, wherein the first picture and the second picture represent the same time instant, encoding one or more first syntax elements, associated with the first picture, with a value indicating that a picture type of the first picture is other than a step-wise temporal sub-layer access picture;

encoding one or more second syntax elements, associated with the second picture, with a value indicating that a picture type of the second picture is a step-wise temporal sub-layer access picture; and encoding at least a third picture on a second scalability layer and on a temporal sub-layer higher than the lowest temporal sub-layer.

According to an eleventh embodiment there is provided an apparatus comprising a video encoder configured for encoding a bitstream comprising an image sequence, the video encoder comprising means for encoding a first picture on a first scalability layer and on a lowest temporal sub-layer;

means for encoding a second picture on a second scalability layer and on the lowest temporal sub-layer, wherein the first picture and the second picture represent the same time instant, means for encoding one or more first syntax elements, associated with the first picture, with a value indicating that a picture type of the first picture is other than a step-wise temporal sub-layer access picture;

means for encoding one or more second syntax elements, associated with the second picture, with a value indicating that a picture type of the second picture is a step-wise temporal sub-layer access picture; and means for encoding at least a third picture on a second scalability layer and on a temporal sub-layer higher than the lowest temporal sub-layer.

According to a twelfth embodiment there is provided a video encoder configured for encoding a bitstream comprising an image sequence, wherein said video encoder is further configured for:

encoding a first picture on a first scalability layer and on a lowest temporal sub-layer;

encoding a second picture on a second scalability layer and on the lowest temporal sub-layer, wherein the first picture and the second picture represent the same time instant, encoding one or more first syntax elements, associated with the first picture, with a value indicating that a picture type of the first picture is other than a step-wise temporal sub-layer access picture;

encoding one or more second syntax elements, associated with the second picture, with a value indicating that a picture type of the second picture is a step-wise temporal sub-layer access picture; and encoding at least a third picture on a second scalability layer and on a temporal sub-layer higher than the lowest temporal sub-layer.

A method according to a thirteenth embodiment comprises encoding a first picture on a first scalability layer and on a lowest temporal sub-layer;

encoding a second picture on a second scalability layer, wherein the first picture and the second picture belong to same access unit, encoding one or more syntax elements, associated with the said access unit, with a value indicating whether temporal level identifier values are aligned for the coded first and second pictures within said access unit.

A method according to a fourteenth embodiment comprises receiving a bitstream comprising an access unit having a first picture encoded on a first scalability layer and on a lowest temporal sub-layer and a second picture encoded on a second scalability layer;

decoding, from the bitstream, one or more syntax elements, associated with the said access unit, with a value indicating whether temporal level identifier values are aligned for the coded first and second pictures within said access unit; and selecting a decoding operation for said first and second pictures according to said value.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
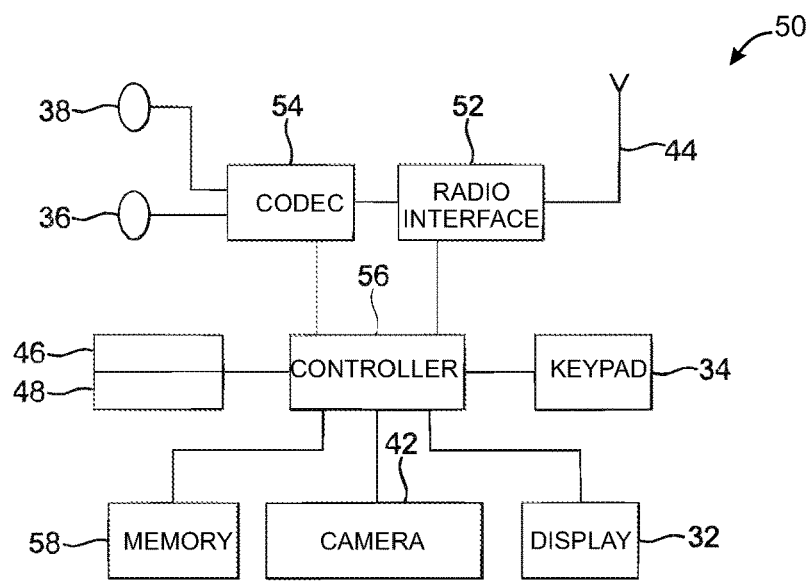
FIG. 1 shows schematically an electronic device employing embodiments of the invention.
Figure 2:
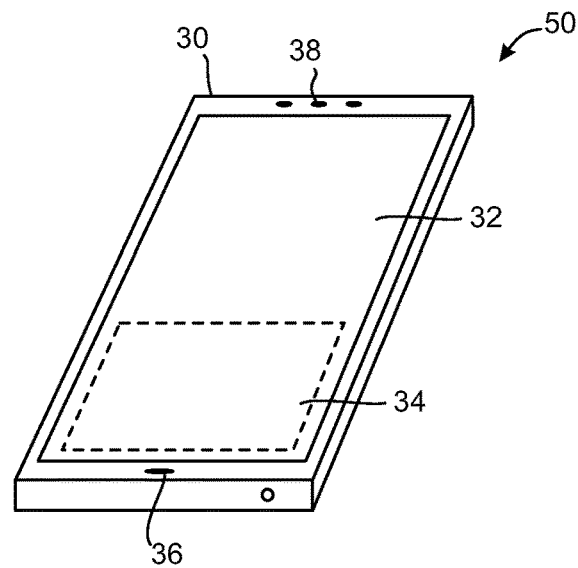
FIG. 2 shows schematically a user equipment suitable for employing embodiments of the invention.

The following describes in further detail suitable apparatus and possible mechanisms for encoding an enhancement layer sub-picture without significantly sacrificing the coding efficiency. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding.

Figure 3:
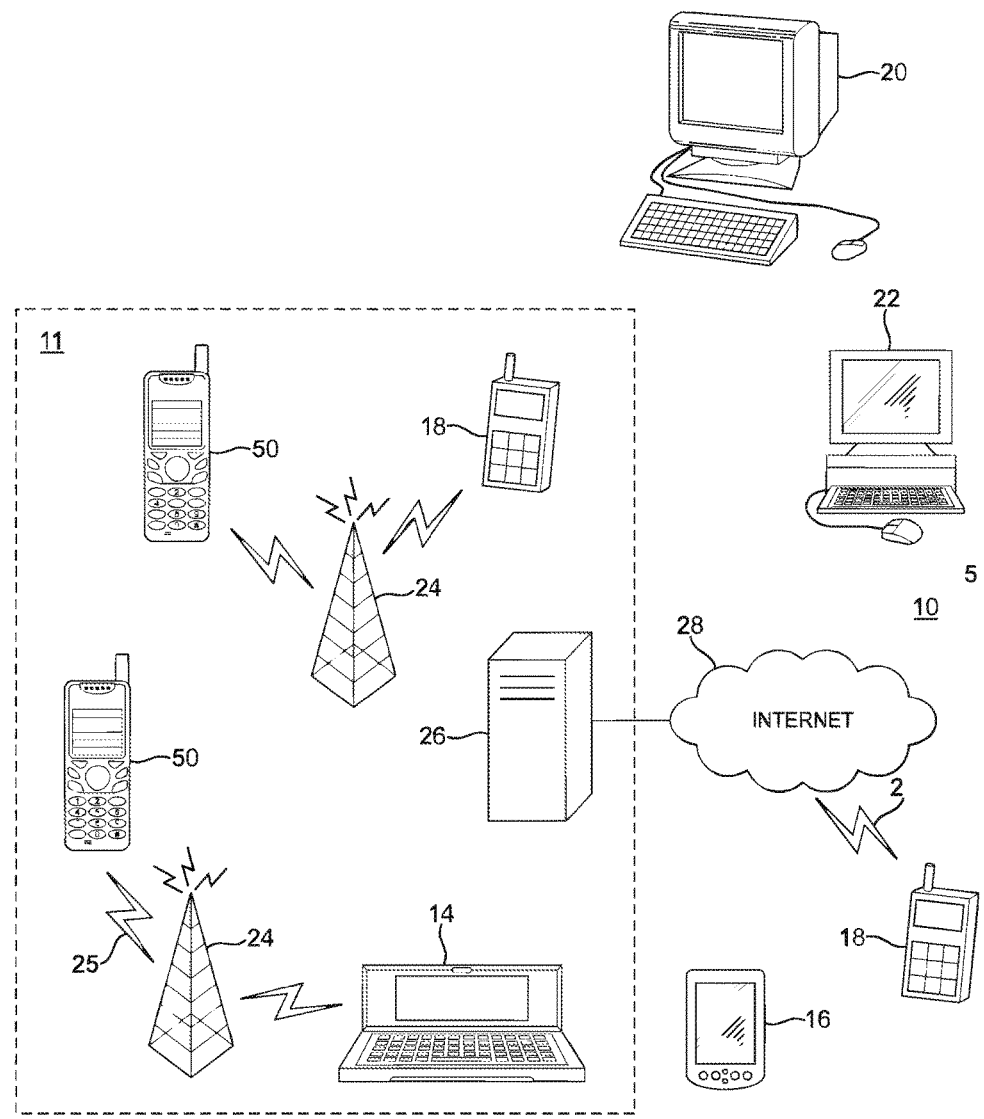
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Video codec consists of an encoder that transforms the input video into a compressed representation suited for storage/transmission and a decoder that can uncompress the compressed video representation back into a viewable form. Typically encoder discards some information in the original video sequence in order to represent the video in a more compact form (that is, at lower bitrate).

Typical hybrid video codecs, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
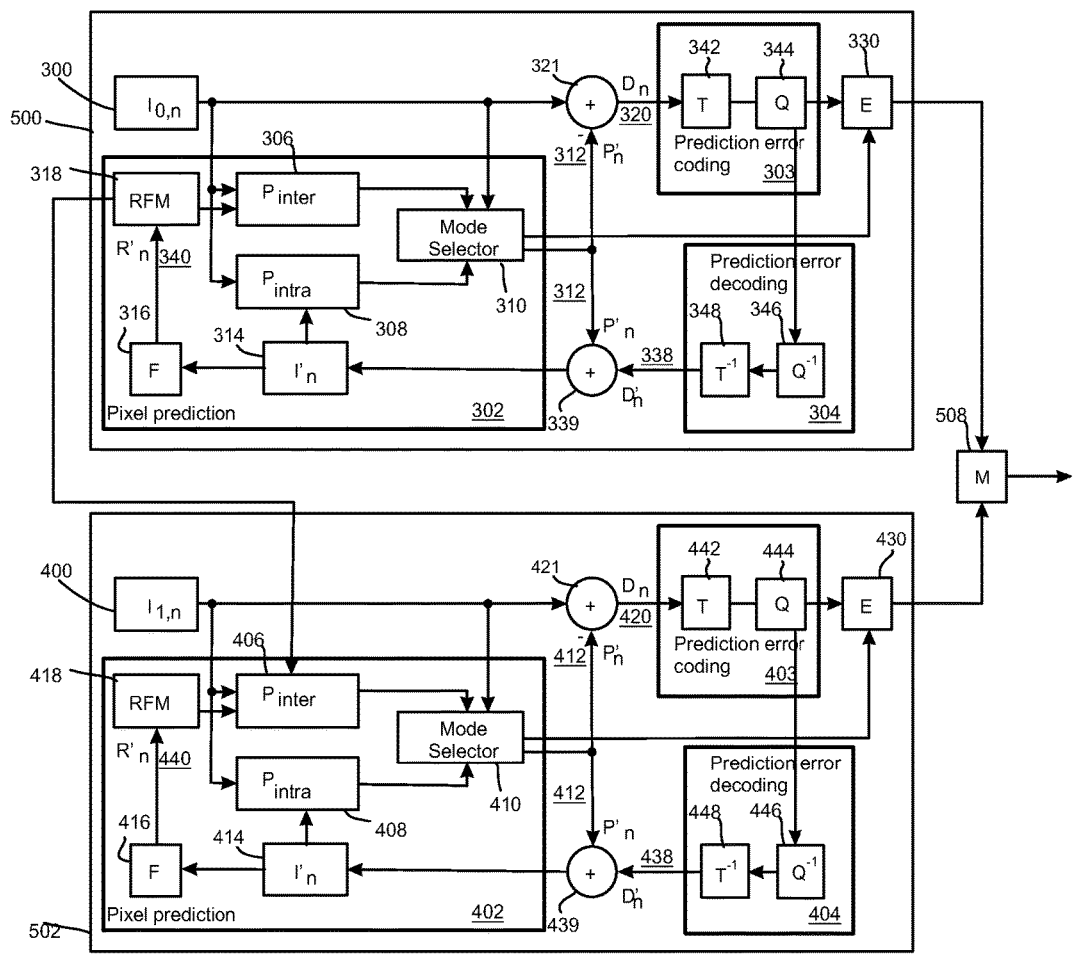
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

The High Efficiency Video Coding (H.265/HEVC) standard was developed by the Joint Collaborative Team-Video Coding (JCT-VC) of VCEG and MPEG. The standard is or will be published by both parent standardization organizations, and it is referred to as ITU-T Recommendation H.265 and ISO/IEC International Standard 23008-2, also known as MPEG-H Part 2 High Efficiency Video Coding (HEVC). There are currently ongoing standardization projects to develop extensions to H.265/HEVC, including scalable, multiview, three-dimensional, and fidelity range extensions, which may be abbreviated SHVC, MV-HEVC, 3D-HEVC, and REXT, respectively.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order. In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

A profile may be defined as a subset of the entire bitstream syntax that is specified by a decoding/coding standard or specification. Within the bounds imposed by the syntax of a given profile it is still possible to require a very large variation in the performance of encoders and decoders depending upon the values taken by syntax elements in the bitstream such as the specified size of the decoded pictures. In many applications, it might be neither practical nor economic to implement a decoder capable of dealing with all hypothetical uses of the syntax within a particular profile. In order to deal with this issue, levels may be used. A level may be defined as a specified set of constraints imposed on values of the syntax elements in the bitstream and variables specified in a decoding/coding standard or specification. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that most or all aspects of the definition of each level may be common across different profiles.

The elementary unit for the input to an H.264/AVC or HEVC encoder and the output of an H.264/AVC or HEVC decoder, respectively, is a picture. A picture given as an input to an encoder may also referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

The directionality of a prediction mode for intra prediction, i.e. the prediction direction to be applied in a particular prediction mode, may be vertical, horizontal, diagonal. For example, in HEVC, intra prediction provides up to 33 directional prediction modes, depending on the size of PUs, and each of the intra prediction modes has a prediction direction assigned to it.

Similarly each TU is associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

Figure 5:
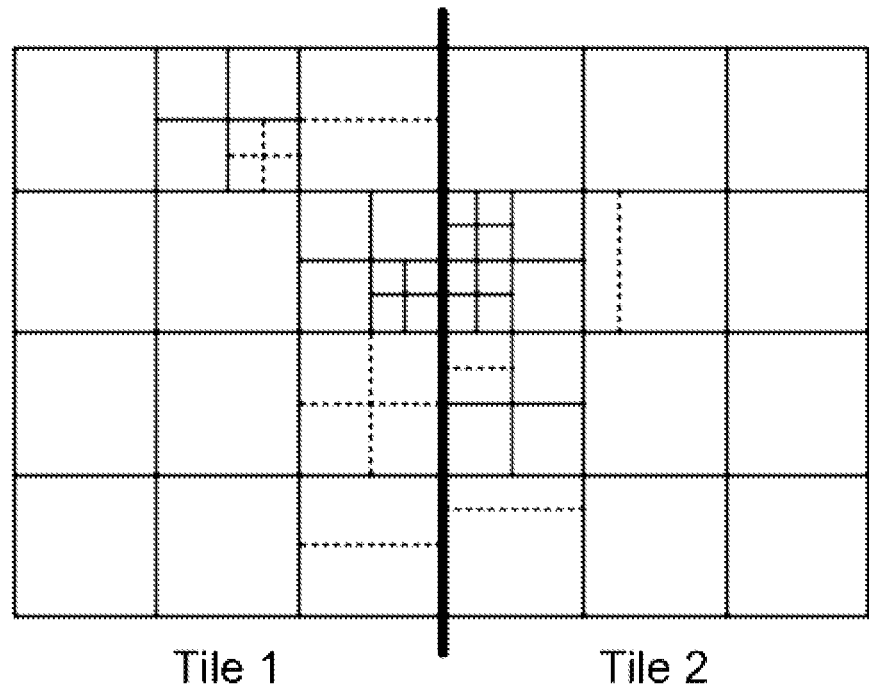
FIG. 5 shows an example of a picture consisting of two tiles.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In a draft HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order. FIG. 5 shows an example of a picture consisting of two tiles partitioned into square coding units (solid lines) which have been further partitioned into rectangular prediction units (dashed lines).

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF).

In SAO, a picture is divided into regions where a separate SAO decision is made for each region. The SAO information in a region is encapsulated in a SAO parameters adaptation unit (SAO unit) and in HEVC, the basic unit for adapting SAO parameters is CTU (therefore an SAO region is the block covered by the corresponding CTU).

In the SAO algorithm, samples in a CTU are classified according to a set of rules and each classified set of samples are enhanced by adding offset values. The offset values are signalled in the bitstream. There are two types of offsets: 1) Band offset 2) Edge offset. For a CTU, either no SAO or band offset or edge offset is employed. Choice of whether no SAO or band or edge offset to be used may be decided by the encoder with e.g. rate distortion optimization (RDO) and signaled to the decoder.

In the band offset, the whole range of sample values is in certain cases divided into 32 equal-width bands. For example, for 8-bit samples, width of a band is 8 (=256/32). Out of 32 bands, 4 of them are selected and different offsets are signalled for each of the selected bands. The selection decision is made by the encoder and may be signalled as follows: The index of the first band is signalled and then it is inferred that the following four bands are the chosen ones. The band offset may be useful in correcting errors in smooth regions.

In the edge offset type, the edge offset (EO) type may be chosen out of four possible types (or edge classifications) where each type is associated with a direction: 1) vertical, 2) horizontal, 3) 135 degrees diagonal, and 4) 45 degrees diagonal. The choice of the direction is given by the encoder and signalled to the decoder. Each type defines the location of two neighbour samples for a given sample based on the angle. Then each sample in the CTU is classified into one of five categories based on comparison of the sample value against the values of the two neighbour samples. The five categories are described as follows:

1. Current sample value is smaller than the two neighbour samples
2. Current sample value is smaller than one of the neighbors and equal to the other neighbor 3. Current sample value is greater than one of the neighbors and equal to the other neighbor
4. Current sample value is greater than two neighbour samples
5. None of the above These five categories are not required to be signalled to the decoder because the classification is based on only reconstructed samples, which may be available and identical in both the encoder and decoder. After each sample in an edge offset type CTU is classified as one of the five categories, an offset value for each of the first four categories is determined and signalled to the decoder. The offset for each category is added to the sample values associated with the corresponding category. Edge offsets may be effective in correcting ringing artifacts.

The SAO parameters may be signalled as interleaved in CTU data. Above CTU, slice header contains a syntax element specifying whether SAO is used in the slice. If SAO is used, then two additional syntax elements specify whether SAO is applied to Cb and Cr components. For each CTU, there are three options: 1) copying SAO parameters from the left CTU, 2) copying SAO parameters from the above CTU, or 3) signalling new SAO parameters.

The adaptive loop filter (ALF) is another method to enhance quality of the reconstructed samples. This may be achieved by filtering the sample values in the loop. The encoder may determine which region of the pictures are to be filtered and the filter coefficients based on e.g. RDO and this information is signalled to the decoder.

In typical video codecs the motion information is indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C = D + \lambda R, \qquad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit. In H.264/AVC, the NAL unit header indicates whether a coded slice contained in the NAL unit is a part of a reference picture or a non-reference picture.

H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy.

In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit reserved field (called nuh_layer_id). The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units.

The six-bit reserved field (nuh_layer_id) is expected to be used by extensions such as a future scalable and 3D video extension. It is expected that these six bits would carry information on the scalability hierarchy. Without loss of generality, in some example embodiments embodiments a variable LayerId is derived from the value of nuh_layer_id for example as follows: LayerId=nuh_layer_id. In the following, layer identifier, LayerId, nuh_layer_id and layer_id are used interchangeably unless otherwise indicated.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU.

In H.264/AVC, a coded slice NAL unit can be indicated to be a coded slice in an Instantaneous Decoding Refresh (IDR) picture or coded slice in a non-IDR picture.

In HEVC, a coded slice NAL unit can be indicated to be one of the following types:

| nal_unit_type | Name of nal_unit_type | Content of NAL unit and RBSP syntax structure |
|---|---|---|
| 0,<br>1 | TRAIL_N,<br>TRAIL_R | Coded slice segment of a non-TSA, non-STSA trailing picture<br>slice_segment_layer_rbsp( ) |
| 2,<br>3 | TSA_N,<br>TSA_R | Coded slice segment of a TSA picture<br>slice_segment_layer_rbsp( ) |
| 4,<br>5 | STSA_N,<br>STSA_R | Coded slice segment of an STSA picture<br>slice_layer_rbsp( ) |
| 6,<br>7 | RADL_N,<br>RADL_R | Coded slice segment of a RADL picture<br>slice_layer_rbsp( ) |
| 8,<br>9 | RASL_N,<br>RASL_R, | Coded slice segment of a RASL picture<br>slice_layer_rbsp( ) |
| 10,<br>12,<br>14 | RSV_VCL_N10<br>RSV_VCL_N12<br>RSV_VCL_N14 | Reserved // reserved non-RAP non-reference VCL NAL unit types |
| 11,<br>13,<br>15 | RSV_VCL_R11<br>RSV_VCL_R13<br>RSV_VCL_R15 | Reserved // reserved non-RAP reference VCL NAL unit types |
| 16,<br>17,<br>18 | BLA_W_LP<br>BLA_W_DLP (a.k.a.<br>BLA_N_LP | Coded slice segment of a BLA picture<br>slice_segment_layer_rbsp( ) |
| 19,<br>20 | IDR_W_DLP (a.k.a.<br>IDR_W_RADL)<br>IDR_N_LP | Coded slice segment of an IDR picture<br>slice_segment_layer_rbsp( ) |
| 21 | CRA_NUT | Coded slice segment of a CRA picture<br>slice_segment_layer_rbsp( ) |
| 22,<br>23 | RSV_IRAP_VCL22<br>. . .<br>RSV_IRAP_VCL23 | Reserved // reserved RAP VCL NAL unit types |
| 24 . . . 31 | RSV_VCL24 . . .<br>RSV_VCL31 | Reserved // reserved non-RAP VCL NAL unit types |

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture, is a picture where each slice or slice segment has nal_unit_type in the range of 16 to 23, inclusive. A RAP picture contains only intra-coded slices, and may be a BLA picture, a CRA picture or an IDR picture. The first picture in the bitstream is a RAP picture. Provided the necessary parameter sets are available when they need to be activated, the RAP picture and all subsequent non-RASL pictures in decoding order can be correctly decoded without performing the decoding process of any pictures that precede the RAP picture in decoding order. There may be pictures in a bitstream that contain only intra-coded slices that are not RAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some drafts of the HEVC standard, a RADL picture was referred to a Decodable Leading Picture (DLP).

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In a draft HEVC standard, there was also a third type of parameter sets, here referred to as an Adaptation Parameter Set (APS), which includes parameters that are likely to be unchanged in several coded slices but may change for example for each picture or each few pictures. In a draft HEVC, the APS syntax structure includes parameters or syntax elements related to quantization matrices (QM), adaptive sample offset (SAO), adaptive loop filtering (ALF), and deblocking filtering. In a draft HEVC, an APS is a NAL unit and coded without reference or prediction from any other NAL unit. An identifier, referred to as aps_id syntax element, is included in APS NAL unit, and included and used in the slice header to refer to a particular APS. In another draft HEVC standard, an APS syntax structure only contains ALF parameters. In a draft HEVC standard, an adaptation parameter set RBSP includes parameters that can be referred to by the coded slice NAL units of one or more coded pictures when at least one of sample_adaptive_offset_enabled_flag or adaptive_loop_filter_enabled_flag are equal to 1. In the final published HEVC, the APS syntax structure was removed from the specification text.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC, each slice header includes the identifier of the picture parameter set that is active for the decoding of the picture that contains the slice, and each picture parameter set contains the identifier of the active sequence parameter set. In a draft HEVC standard, a slice header additionally contains an APS identifier, although in the published HEVC standard the APS identifier was removed from the slice header. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A parameter set may be activated by a reference from a slice or from another active parameter set or in some cases from another syntax structure such as a buffering period SEI message.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

Several nesting SEI messages have been specified in the AVC and HEVC standards or proposed otherwise. The idea of nesting SEI messages is to contain one or more SEI messages within a nesting SEI message and provide a mechanism for associating the contained SEI messages with a subset of the bitstream and/or a subset of decoded data. It may be required that a nesting SEI message contains one or more SEI messages that are not nesting SEI messages themselves. An SEI message contained in a nesting SEI message may be referred to as a nested SEI message. An SEI message not contained in a nesting SEI message may be referred to as a non-nested SEI message. The scalable nesting SEI message of HEVC enables to identify either a bitstream subset (resulting from a sub-bitstream extraction process) or a set of layers to which the nested SEI messages apply. A bitstream subset may also be referred to as a sub-bitstream.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In HEVC, no redundant coded picture has been specified.

In H.264/AVC, an access unit (AU) comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain one or more coded pictures with different values of nuh_layer_id. In addition to containing the VCL NAL units of the coded picture, an access unit may also contain non-VCL NAL units.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be an IDR access unit, a BLA access unit, or a CRA access unit. The value of NoRaslOutputFlag is equal to 1 for each IDR access unit, each BLA access unit, and each CRA access unit that is the first access unit in the bitstream in decoding order, is the first access unit that follows an end of sequence NAL unit in decoding order, or has HandleCraAsBlaFlag equal to 1. NoRaslOutputFlag equal to 1 has an impact that the RASL pictures associated with the IRAP picture for which the NoRaslOutputFlag is set are not output by the decoder. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

A Structure of Pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. All pictures in the previous SOP precede in decoding order all pictures in the current SOP and all pictures in the next SOP succeed in decoding order all pictures in the current SOP. A SOP may represent a hierarchical and repetitive inter prediction structure. The term group of pictures (GOP) may sometimes be used interchangeably with the term SOP and having the same semantics as the semantics of SOP.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In HEVC, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0 (a.k.a. RefPicSetStCurrBefore), RefPicSetStCurr1 (a.k.a. RefPicSetStCurrAfter), RefPicSetStFoll0, RefPicSetStFoll1, RefPicSetLtCurr, and RefPicSetLtFoll. RefPicSetStFoll0 and RefPicSetStFoll1 may also be considered to form jointly one subset RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as reference picture list 0 and reference picture list 1, is typically constructed in two steps: First, an initial reference picture list is generated. The initial reference picture list may be generated for example on the basis of frame_num, POC, temporal_id (or TemporalId or alike), or information on the prediction hierarchy such as GOP structure, or any combination thereof. Second, the initial reference picture list may be reordered by reference picture list reordering (RPLR) commands, also known as reference picture list modification syntax structure, which may be contained in slice headers. In H.264/AVC, the RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Figure 6:
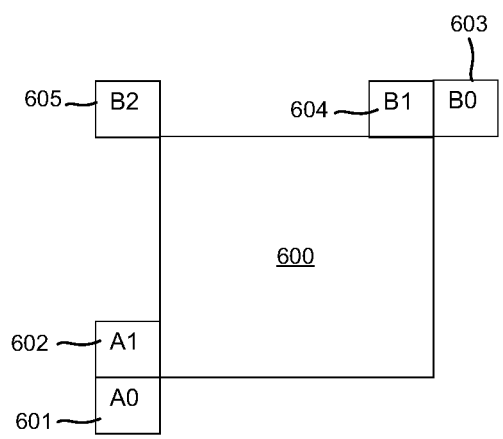
FIG. 6 shows an example of a current block and five spatial neighbors usable as motion prediction candidates.

The advanced motion vector prediction (AMVP) or alike may operate for example as follows, while other similar realizations of advanced motion vector prediction are also possible for example with different candidate position sets and candidate locations with candidate position sets. Two spatial motion vector predictors (MVPs) may be derived and a temporal motion vector predictor (TMVP) may be derived. They may be selected among the positions shown in FIG. 6: three spatial motion vector predictor candidate positions 603, 604, 605 located above the current prediction block 600 (B0, B1, B2) and two 601, 602 on the left (A0, A1). The first motion vector predictor that is available (e.g. resides in the same slice, is inter-coded, etc.) in a pre-defined order of each candidate position set, (B0, B1, B2) or (A0, A1), may be selected to represent that prediction direction (up or left) in the motion vector competition. A reference index for the temporal motion vector predictor may be indicated by the encoder in the slice header (e.g. as a collocated_ref_idx syntax element). The motion vector obtained from the co-located picture may be scaled according to the proportions of the picture order count differences of the reference picture of the temporal motion vector predictor, the co-located picture, and the current picture. Moreover, a redundancy check may be performed among the candidates to remove identical candidates, which can lead to the inclusion of a zero motion vector in the candidate list. The motion vector predictor may be indicated in the bitstream for example by indicating the direction of the spatial motion vector predictor (up or left) or the selection of the temporal motion vector predictor candidate.

Many high efficiency video codecs such as HEVC codec employ an additional motion information coding/decoding mechanism, often called merging/merge mode/process/mechanism, where all the motion information of a block/PU is predicted and used without any modification/correction. The aforementioned motion information for a PU may comprise one or more of the following: 1) The information whether 'the PU is uni-predicted using only reference picture list0' or 'the PU is uni-predicted using only reference picture list1' or 'the PU is bi-predicted using both reference picture list0 and list1'; 2) Motion vector value corresponding to the reference picture list0, which may comprise a horizontal and vertical motion vector component; 3) Reference picture index in the reference picture list0 and/or an identifier of a reference picture pointed to by the motion vector corresponding to reference picture list0, where the identifier of a reference picture may be for example a picture order count value, a layer identifier value (for inter-layer prediction), or a pair of a picture order count value and a layer identifier value; 4) Information of the reference picture marking of the reference picture, e.g. information whether the reference picture was marked as "used for short-term reference" or "used for long-term reference"; 5)-7) The same as 2)-4), respectively, but for reference picture list1. Similarly, predicting the motion information is carried out using the motion information of adjacent blocks and/or co-located blocks in temporal reference pictures. A list, often called as a merge list, may be constructed by including motion prediction candidates associated with available adjacent/co-located blocks and the index of selected motion prediction candidate in the list is signalled and the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism may also be employed for individual PUs (not necessarily the whole CU as in skip mode) and in this case, prediction residual may be utilized to improve prediction quality. This type of prediction mode is typically named as an inter-merge mode.

One of the candidates in the merge list may be a TMVP candidate, which may be derived from the collocated block within an indicated or inferred reference picture, such as the reference picture indicated for example in the slice header for example using the collocated_ref_idx syntax element or alike In HEVC the so-called target reference index for temporal motion vector prediction in the merge list is set as 0 when the motion coding mode is the merge mode. When the motion coding mode in HEVC utilizing the temporal motion vector prediction is the advanced motion vector prediction mode, the target reference index values are explicitly indicated (e.g. per each PU).

When the target reference index value has been determined, the motion vector value of the temporal motion vector prediction may be derived as follows: Motion vector at the block that is co-located with the bottom-right neighbor of the current prediction unit is calculated. The picture where the co-located block resides may be e.g. determined according to the signalled reference index in the slice header as described above. The determined motion vector at the co-located block is scaled with respect to the ratio of a first picture order count difference and a second picture order count difference. The first picture order count difference is derived between the picture containing the co-located block and the reference picture of the motion vector of the co-located block. The second picture order count difference is derived between the current picture and the target reference picture. If one but not both of the target reference picture and the reference picture of the motion vector of the co-located block is a long-term reference picture (while the other is a short-term reference picture), the TMVP candidate may be considered unavailable. If both of the target reference picture and the reference picture of the motion vector of the co-located block are long-term reference pictures, no POC-based motion vector scaling may be applied.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content. The coded interlaced source content in the base layer may comprise coded fields, coded frames representing field pairs, or a mixture of them. In the interlace-to-progressive scalability, the base-layer picture may be resampled so that it becomes a suitable reference picture for one or more enhancement-layer pictures.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC extension.

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Various technologies for providing three-dimensional (3D) video content are currently investigated and developed. It may be considered that in stereoscopic or two-view video, one video sequence or view is presented for the left eye while a parallel view is presented for the right eye. More than two parallel views may be needed for applications which enable viewpoint switching or for autostereoscopic displays which may present a large number of views simultaneously and let the viewers to observe the content from different viewpoints. Intense studies have been focused on video coding for autostereoscopic displays and such multiview applications wherein a viewer is able to see only one pair of stereo video from a specific viewpoint and another pair of stereo video from a different viewpoint. One of the most feasible approaches for such multiview applications has turned out to be such wherein only a limited number of views, e.g. a mono or a stereo video plus some supplementary data, is provided to a decoder side and all required views are then rendered (i.e. synthesized) locally be the decoder to be displayed on a display.

A view may be defined as a sequence of pictures representing one camera or viewpoint. The pictures representing a view may also be called view components. In other words, a view component may be defined as a coded representation of a view in a single access unit. In multiview video coding, more than one view is coded in a bitstream. Since views are typically intended to be displayed on stereoscopic or multiview autostrereoscopic display or to be used for other 3D arrangements, they typically represent the same scene and are content-wise partly overlapping although representing different viewpoints to the content. Hence, inter-view prediction may be utilized in multiview video coding to take advantage of inter-view correlation and improve compression efficiency. One way to realize inter-view prediction is to include one or more decoded pictures of one or more other views in the reference picture list(s) of a picture being coded or decoded residing within a first view. View scalability may refer to such multiview video coding or multiview video bitstreams, which enable removal or omission of one or more coded views, while the resulting bitstream remains conforming and represents video with a smaller number of views than originally.

Region of Interest (ROI) coding may be defined to refer to coding a particular region within a video at a higher fidelity. There exists several methods for encoders and/or other entities to determine ROIs from input pictures to be encoded. For example, face detection may be used and faces may be determined to be ROIs. Additionally or alternatively, in another example, objects that are in focus may be detected and determined to be ROIs, while objects out of focus are determined to be outside ROIs. Additionally or alternatively, in another example, the distance to objects may be estimated or known, e.g. on the basis of a depth sensor, and ROIs may be determined to be those objects that are relatively close to the camera rather than in the background.

ROI scalability may be defined as a type of scalability wherein an enhancement layer enhances only part of a reference-layer picture e.g. spatially, quality-wise, in bit-depth, and/or along other scalability dimensions. As ROI scalability may be used together with other types of scalabilities, it may be considered to form a different categorization of scalability types. There exists several different applications for ROI coding with different requirements, which may be realized by using ROI scalability. For example, an enhancement layer can be transmitted to enhance the quality and/or a resolution of a region in the base layer. A decoder receiving both enhancement and base layer bitstream might decode both layers and overlay the decoded pictures on top of each other and display the final picture.

Figure 19A:
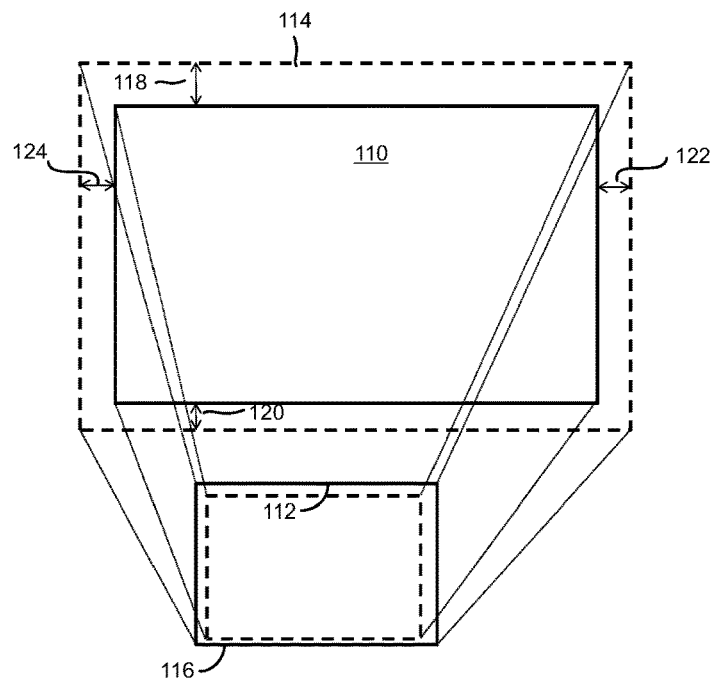
FIGS. 19a and 19b illustrate the usage of scaled reference layer offsets.
Figure 19B:
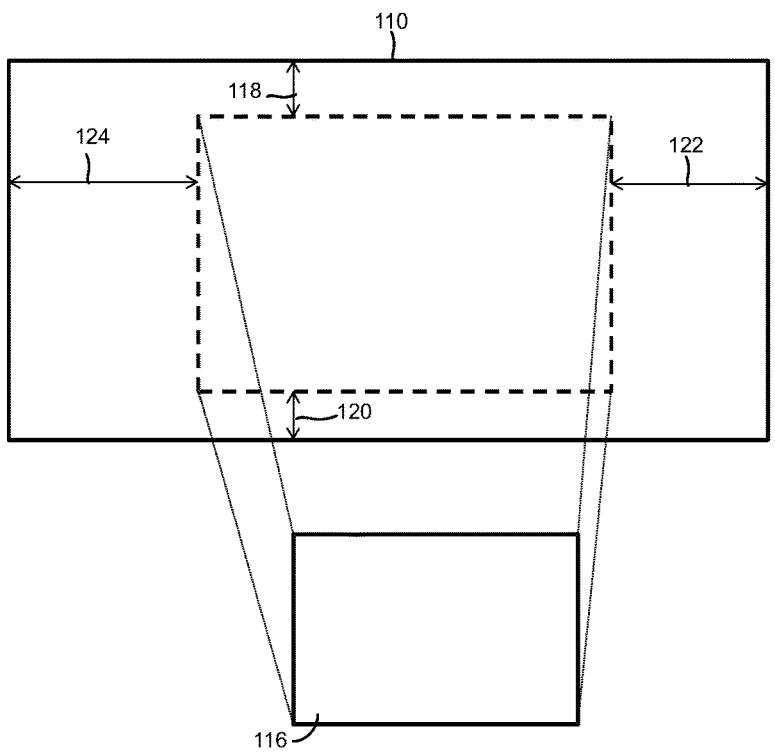

The spatial correspondence between the enhancement layer picture and the reference layer region, or similarly the enhancement layer region and the base layer picture may be indicated by the encoder and/or decoded by the decoder using for example so-called scaled reference layer offsets. Scaled reference layer offsets may be considered to specify the positions of the corner samples of the upsampled reference layer picture relative to the respective corner samples of the enhancement layer picture. The offset values may be signed, which enables the use of the offset values to be used in both types of extended spatial scalability, as illustrated in FIG. 19a and FIG. 19b. In case of region-of-interest scalability (FIG. 19a), the enhancement layer picture 110 corresponds to a region 112 of the reference layer picture 116 and the scaled reference layer offsets indicate the corners of the upsampled reference layer picture that extend the area of the enhance layer picture. Scaled reference layer offsets may be indicated by four syntax elements (e.g. per a pair of an enhancement layer and its reference layer), which may be referred to as scaled_ref_layer_top_offset 118, scaled_ref_layer_bottom_offset 120, scaled_ref_layer_right_offset 122 and scaled_ref_layer_left_offset 124. The reference layer region that is upsampled may be concluded by the encoder and/or the decoder by downscaling the scaled reference layer offsets according to the ratio between the enhancement layer picture height or width and the upsampled reference layer picture height or width, respectively. The downscaled scaled reference layer offset may be then be used to obtain the reference layer region that is upsampled and/or to determine which samples of the reference layer picture collocate to certain samples of the enhancement layer picture. In case the reference layer picture corresponds to a region of the enhancement layer picture (FIG. 19b), the scaled reference layer offsets indicate the corners of the upsampled reference layer picture that are within the area of the enhance layer picture. The scaled reference layer offset may be used to determine which samples of the upsampled reference layer picture collocate to certain samples of the enhancement layer picture. It is also possible to mix the types of extended spatial scalability, i.e apply one type horizontally and another type vertically. Scaled reference layer offsets may be indicated by the encoder in and/or decoded by the decoder from for example a sequence-level syntax structure, such as SPS and/or VPS. The accuracy of scaled reference offsets may be pre-defined for example in a coding standard and/or specified by the encoder and/or decoded by the decoder from the bitstream. For example, an accuracy of ⅟16th of the luma sample size in the enhancement layer may be used. Scaled reference layer offsets may be indicated, decoded, and/or used in the encoding, decoding and/or displaying process when no inter-layer prediction takes place between two layers.

Some coding standards allow creation of scalable bit streams. A meaningful decoded representation can be produced by decoding only certain parts of a scalable bit stream. Scalable bit streams can be used for example for rate adaptation of pre-encoded unicast streams in a streaming server and for transmission of a single bit stream to terminals having different capabilities and/or with different network conditions. A list of some other use cases for scalable video coding can be found in the ISO/IEC JTC1 SC29 WG11 (MPEG) output document N5540, "Applications and Requirements for Scalable Video Coding", the 64$^{th}$ MPEG meeting, Mar. 10 to 14, 2003, Pattaya, Thailand.

A coding standard may include a sub-bitstream extraction process, and such is specified for example in SVC, MVC, and HEVC. The sub-bitstream extraction process relates to converting a bitstream, typically by removing NAL units, to a sub-bitstream, which may also be referred to as a bitstream subset. The sub-bitstream still remains conforming to the standard. For example, in HEVC, the bitstream created by excluding all VCL NAL units having a TemporalId value greater than a selected value and including all other VCL NAL units remains conforming. In HEVC, the sub-bitstream extraction process takes a TemporalId and/or a list of nuh_layer_id values as input and derives a sub-bitstream (also known as a bitstream subset) by removing from the bitstream all NAL units with TemporalId greater than the input TemporalId value or nuh_layer_id value not among the values in the input list of nuh_layer_id values.

A coding standard or system may refer to a term operation point or alike, which may indicate the scalable layers and/or sub-layers under which the decoding operates and/or may be associated with a sub-bitstream that includes the scalable layers and/or sub-layers being decoded. Some non-limiting definitions of an operation point are provided in the following.

In HEVC, an operation point is defined as bitstream created from another bitstream by operation of the sub-bitstream extraction process with the another bitstream, a target highest TemporalId, and a target layer identifier list as inputs.

The VPS of HEVC specifies layer sets and HRD parameters for these layer sets. A layer set may be used as the target layer identifier list in the sub-bitstream extraction process.

In SHVC and MV-HEVC, an operation point definition may include a consideration a target output layer set. In SHVC and MV-HEVC, an operation point may be defined as A bitstream that is created from another bitstream by operation of the sub-bitstream extraction process with the another bitstream, a target highest TemporalId, and a target layer identifier list as inputs, and that is associated with a set of target output layers.

An output layer set may be defined as a set of layers consisting of the layers of one of the specified layer sets, where one or more layers in the set of layers are indicated to be output layers. An output layer may be defined as a layer of an output layer set that is output when the decoder and/or the HRD operates using the output layer set as the target output layer set. In MV-HEVC/SHVC, the variable TargetOptLayerSetIdx may specify which output layer set is the target output layer set by setting TargetOptLayerSetIdx equal to the index of the output layer set that is the target output layer set. TargetOptLayerSetIdx may be set for example by the HRD and/or may be set by external means, for example by a player or alike through an interface provided by the decoder. In MV-HEVC/SHVC, a target output layer may be defined as a layer that is to be output and is one of the output layers of the output layer set with index olsIdx such that TargetOptLayerSetIdx is equal to olsIdx.

MV-HEVC/SHVC enable derivation of a "default" output layer set for each layer set specified in the VPS using a specific mechanism or by indicating the output layers explicitly. Two specific mechanisms have been specified: it may be specified in the VPS that each layer is an output layer or that only the highest layer is an output layer in a "default" output layer set. Auxiliary picture layers may be excluded from consideration when determining whether a layer is an output layer using the mentioned specific mechanisms. In addition, to the "default" output layer sets, the VPS extension enables to specify additional output layer sets with selected layers indicated to be output layers.

In MV-HEVC/SHVC, a profile_tier_level( ) syntax structure is associated for each output layer set. To be more exact, a list of profile_tier_level( ) syntax structures is provided in the VPS extension, and an index to the applicable profile_tier_level( ) within the list is given for each output layer set. In other words, a combination of profile, tier, and level values is indicated for each output layer set.

While a constant set of output layers suits well use cases and bitstreams where the highest layer stays unchanged in each access unit, they may not support use cases where the highest layer changes from one access unit to another. It has therefore been proposed that encoders can specify the use of alternative output layers within the bitstream and in response to the specified use of alternative output layers decoders output a decoded picture from an alternative output layer in the absence of a picture in an output layer within the same access unit. Several possibilities exist how to indicate alternative output layers. For example, each output layer in an output layer set may be associated with a minimum alternative output layer, and output-layer-wise syntax element(s) may be used for specifying alternative output layer(s) for each output layer. Alternatively, the alternative output layer set mechanism may be constrained to be used only for output layer sets containing only one output layer, and output-layer-set-wise syntax element(s) may be used for specifying alternative output layer(s) for the output layer of the output layer set. Alternatively, the alternative output layer set mechanism may be constrained to be used only for bitstreams or CVSs in which all specified output layer sets contain only one output layer, and the alternative output layer(s) may be indicated by bitstream- or CVS-wise syntax element(s). The alternative output layer(s) may be for example specified by listing e.g. within VPS the alternative output layers (e.g. using their layer identifiers or indexes of the list of direct or indirect reference layers), indicating a minimum alternative output layer (e.g. using its layer identifier or its index within the list of direct or indirect reference layers), or a flag specifying that any direct or indirect reference layer is an alternative output layer. When more than one alternative output layer is enabled to be used, it may be specified that the first direct or indirect inter-layer reference picture present in the access unit in descending layer identifier order down to the indicated minimum alternative output layer is output.

In MVC, an operation point may be defined as follows: An operation point is identified by a temporal_id value representing the target temporal level and a set of view_id values representing the target output views. One operation point is associated with a bitstream subset, which consists of the target output views and all other views the target output views depend on, that is derived using the sub-bitstream extraction process with tIdTarget equal to the temporal_id value and viewIdTargetList consisting of the set of view_id values as inputs. More than one operation point may be associated with the same bitstream subset. When "an operation point is decoded", a bitstream subset corresponding to the operation point may be decoded and subsequently the target output views may be output.

As indicated earlier, MVC is an extension of H.264/AVC. Many of the definitions, concepts, syntax structures, semantics, and decoding processes of H.264/AVC apply also to MVC as such or with certain generalizations or constraints. Some definitions, concepts, syntax structures, semantics, and decoding processes of MVC are described in the following.

An access unit in MVC is defined to be a set of NAL units that are consecutive in decoding order and contain exactly one primary coded picture consisting of one or more view components. In addition to the primary coded picture, an access unit may also contain one or more redundant coded pictures, one auxiliary coded picture, or other NAL units not containing slices or slice data partitions of a coded picture. The decoding of an access unit results in one decoded picture consisting of one or more decoded view components, when decoding errors, bitstream errors or other errors which may affect the decoding do not occur. In other words, an access unit in MVC contains the view components of the views for one output time instance.

A view component may be referred to as a coded representation of a view in a single access unit.

Inter-view prediction may be used in MVC and may refer to prediction of a view component from decoded samples of different view components of the same access unit. In MVC, inter-view prediction is realized similarly to inter prediction. For example, inter-view reference pictures are placed in the same reference picture list(s) as reference pictures for inter prediction, and a reference index as well as a motion vector are coded or inferred similarly for inter-view and inter reference pictures.

An anchor picture is a coded picture in which all slices may reference only slices within the same access unit, i.e., inter-view prediction may be used, but no inter prediction is used, and all following coded pictures in output order do not use inter prediction from any picture prior to the coded picture in decoding order. Inter-view prediction may be used for IDR view components that are part of a non-base view. A base view in MVC is a view that has the minimum value of view order index in a coded video sequence. The base view can be decoded independently of other views and does not use inter-view prediction. The base view can be decoded by H.264/AVC decoders supporting only the single-view profiles, such as the Baseline Profile or the High Profile of H.264/AVC.

In the MVC standard, many of the sub-processes of the MVC decoding process use the respective sub-processes of the H.264/AVC standard by replacing term "picture", "frame", and "field" in the sub-process specification of the H.264/AVC standard by "view component", "frame view component", and "field view component", respectively. Likewise, terms "picture", "frame", and "field" are often used in the following to mean "view component", "frame view component", and "field view component", respectively.

In the context of multiview video coding, view order index may be defined as an index that indicates the decoding or bitstream order of view components in an access unit. In MVC, the inter-view dependency relationships are indicated in a sequence parameter set MVC extension, which is included in a sequence parameter set. According to the MVC standard, all sequence parameter set MVC extensions that are referred to by a coded video sequence are required to be identical.

A texture view refers to a view that represents ordinary video content, for example has been captured using an ordinary camera, and is usually suitable for rendering on a display. A texture view typically comprises pictures having three components, one luma component and two chroma components. In the following, a texture picture typically comprises all its component pictures or color components unless otherwise indicated for example with terms luma texture picture and chroma texture picture.

A depth view refers to a view that represents distance information of a texture sample from the camera sensor, disparity or parallax information between a texture sample and a respective texture sample in another view, or similar information. A depth view may comprise depth pictures (a.k.a. depth maps) having one component, similar to the luma component of texture views. A depth map is an image with per-pixel depth information or similar. For example, each sample in a depth map represents the distance of the respective texture sample or samples from the plane on which the camera lies. In other words, if the z axis is along the shooting axis of the cameras (and hence orthogonal to the plane on which the cameras lie), a sample in a depth map represents the value on the z axis. The semantics of depth map values may for example include the following:

1. Each luma sample value in a coded depth view component represents an inverse of real-world distance (Z) value, i.e. 1/Z, normalized in the dynamic range of the luma samples, such as to the range of 0 to 255, inclusive, for 8-bit luma representation. The normalization may be done in a manner where the quantization 1/Z is uniform in terms of disparity.
2. Each luma sample value in a coded depth view component represents an inverse of real-world distance (Z) value, i.e. 1/Z, which is mapped to the dynamic range of the luma samples, such as to the range of 0 to 255, inclusive, for 8-bit luma representation, using a mapping function f(1/Z) or table, such as a piece-wise linear mapping. In other words, depth map values result in applying the function f(1/Z).
3. Each luma sample value in a coded depth view component represents a real-world distance (Z) value normalized in the dynamic range of the luma samples, such as to the range of 0 to 255, inclusive, for 8-bit luma representation.
4. Each luma sample value in a coded depth view component represents a disparity or parallax value from the present depth view to another indicated or derived depth view or view position.

The semantics of depth map values may be indicated in the bitstream for example within a video parameter set syntax structure, a sequence parameter set syntax structure, a video usability information syntax structure, a picture parameter set syntax structure, a camera/depth/adaptation parameter set syntax structure, a supplemental enhancement information message, or anything alike.

Depth-enhanced video refers to texture video having one or more views associated with depth video having one or more depth views. A number of approaches may be used for representing of depth-enhanced video, including the use of video plus depth (V+D), multiview video plus depth (MVD), and layered depth video (LDV). In the video plus depth (V+D) representation, a single view of texture and the respective view of depth are represented as sequences of texture picture and depth pictures, respectively. The MVD representation contains a number of texture views and respective depth views. In the LDV representation, the texture and depth of the central view are represented conventionally, while the texture and depth of the other views are partially represented and cover only the dis-occluded areas required for correct view synthesis of intermediate views.

A texture view component may be defined as a coded representation of the texture of a view in a single access unit. A texture view component in depth-enhanced video bitstream may be coded in a manner that is compatible with a single-view texture bitstream or a multi-view texture bitstream so that a single-view or multi-view decoder can decode the texture views even if it has no capability to decode depth views. For example, an H.264/AVC decoder may decode a single texture view from a depth-enhanced H.264/AVC bitstream. A texture view component may alternatively be coded in a manner that a decoder capable of single-view or multi-view texture decoding, such H.264/AVC or MVC decoder, is not able to decode the texture view component for example because it uses depth-based coding tools. A depth view component may be defined as a coded representation of the depth of a view in a single access unit. A view component pair may be defined as a texture view component and a depth view component of the same view within the same access unit.

Depth-enhanced video may be coded in a manner where texture and depth are coded independently of each other. For example, texture views may be coded as one MVC bitstream and depth views may be coded as another MVC bitstream. Depth-enhanced video may also be coded in a manner where texture and depth are jointly coded. In a form of a joint coding of texture and depth views, some decoded samples of a texture picture or data elements for decoding of a texture picture are predicted or derived from some decoded samples of a depth picture or data elements obtained in the decoding process of a depth picture. Alternatively or in addition, some decoded samples of a depth picture or data elements for decoding of a depth picture are predicted or derived from some decoded samples of a texture picture or data elements obtained in the decoding process of a texture picture. In another option, coded video data of texture and coded video data of depth are not predicted from each other or one is not coded/decoded on the basis of the other one, but coded texture and depth view may be multiplexed into the same bitstream in the encoding and demultiplexed from the bitstream in the decoding. In yet another option, while coded video data of texture is not predicted from coded video data of depth in e.g. below slice layer, some of the high-level coding structures of texture views and depth views may be shared or predicted from each other. For example, a slice header of coded depth slice may be predicted from a slice header of a coded texture slice. Moreover, some of the parameter sets may be used by both coded texture views and coded depth views.

Scalability may be enabled in two basic ways. Either by introducing new coding modes for performing prediction of pixel values or syntax from lower layers of the scalable representation or by placing the lower layer pictures to a reference picture buffer (e.g. a decoded picture buffer, DPB) of the higher layer. The first approach may be more flexible and thus may provide better coding efficiency in most cases. However, the second, reference frame based scalability, approach may be implemented efficiently with minimal changes to single layer codecs while still achieving majority of the coding efficiency gains available. Essentially a reference frame based scalability codec may be implemented by utilizing the same hardware or software implementation for all the layers, just taking care of the DPB management by external means.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS).

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, block partitioning, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

Scalable video (de)coding may be realized with a concept known as single-loop decoding, where decoded reference pictures are reconstructed only for the highest layer being decoded while pictures at lower layers may not be fully decoded or may be discarded after using them for inter-layer prediction. In single-loop decoding, the decoder performs motion compensation and full picture reconstruction only for the scalable layer desired for playback (called the "desired layer" or the "target layer"), thereby reducing decoding complexity when compared to multi-loop decoding. All of the layers other than the desired layer do not need to be fully decoded because all or part of the coded picture data is not needed for reconstruction of the desired layer. However, lower layers (than the target layer) may be used for inter-layer syntax or parameter prediction, such as inter-layer motion prediction. Additionally or alternatively, lower layers may be used for inter-layer intra prediction and hence intra-coded blocks of lower layers may have to be decoded. Additionally or alternatively, inter-layer residual prediction may be applied, where the residual information of the lower layers may be used for decoding of the target layer and the residual information may need to be decoded or reconstructed. In some coding arrangements, a single decoding loop is needed for decoding of most pictures, while a second decoding loop may be selectively applied to reconstruct so-called base representations (i.e. decoded base layer pictures), which may be needed as prediction references but not for output or display.

SVC as allows the use of single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer.

A single decoding loop is needed for decoding of most pictures, while a second decoding loop is selectively applied to reconstruct the base representations, which are needed as prediction references but not for output or display, and are reconstructed only for the so called key pictures (for which "store_ref_base_pic_flag" is equal to 1).

FGS was included in some draft versions of the SVC standard, but it was eventually excluded from the final SVC standard. FGS is subsequently discussed in the context of some draft versions of the SVC standard. The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

The scalability structure in SVC may be characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer. At any temporal location, and with an identical "dependency_id" value, a picture with "quality_id" equal to QL uses the picture with "quality_id" equal to QL-1 for inter-layer prediction. A coded slice with "quality_id" larger than 0 may be coded as either a truncatable FGS slice or a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared to older video compression standards, SVC's spatial scalability has been generalized to enable the base layer to be a cropped and zoomed version of the enhancement layer.

MGS quality layers are indicated with "quality_id" similarly as FGS quality layers. For each dependency unit (with the same "dependency_id"), there is a layer with "quality_id" equal to 0 and there can be other layers with "quality_id" greater than 0. These layers with "quality_id" greater than 0 are either MGS layers or FGS layers, depending on whether the slices are coded as truncatable slices.

In the basic form of FGS enhancement layers, only inter-layer prediction is used. Therefore, FGS enhancement layers can be truncated freely without causing any error propagation in the decoded sequence. However, the basic form of FGS suffers from low compression efficiency. This issue arises because only low-quality pictures are used for inter prediction references. It has therefore been proposed that FGS-enhanced pictures be used as inter prediction references. However, this may cause encoding-decoding mismatch, also referred to as drift, when some FGS data are discarded.

One feature of a draft SVC standard is that the FGS NAL units can be freely dropped or truncated, and a feature of the SVC standard is that MGS NAL units can be freely dropped (but cannot be truncated) without affecting the conformance of the bitstream. As discussed above, when those FGS or MGS data have been used for inter prediction reference during encoding, dropping or truncation of the data would result in a mismatch between the decoded pictures in the decoder side and in the encoder side. This mismatch is also referred to as drift.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency.

Each NAL unit includes in the NAL unit header a syntax element "use_ref_base_pic_flag." When the value of this element is equal to 1, decoding of the NAL unit uses the base representations of the reference pictures during the inter prediction process. The syntax element "store_ref_base_pic_ flag" specifies whether (when equal to 1) or not (when equal to 0) to store the base representation of the current picture for future pictures to use for inter prediction.

NAL units with "quality_id" greater than 0 do not contain syntax elements related to reference picture lists construction and weighted prediction, i.e., the syntax elements "num_ref_active_1x_minus1" (x=0 or 1), the reference picture list reordering syntax table, and the weighted prediction syntax table are not present. Consequently, the MGS or FGS layers have to inherit these syntax elements from the NAL units with "quality_id" equal to 0 of the same dependency unit when needed.

In SVC, a reference picture list consists of either only base representations (when "use_ref_base_pic_flag" is equal to 1) or only decoded pictures not marked as "base representation" (when "use_ref_base_pic_flag" is equal to 0), but never both at the same time.

Another categorization of scalable coding is based on whether the same or different coding standard or technology is used as the basis for the base layer and enhancement layers. Terms hybrid codec scalability or standards scalability may be used to indicate a scenario where one coding standard or system is used for some layers, while another coding standard or system is used for some other layers. For example, the base layer may be AVC-coded, while one or more enhancement layers may be coded with an HEVC extension, such as SHVC or MV-HEVC.

Work is ongoing to specify scalable and multiview extensions to the HEVC standard. The multiview extension of HEVC, referred to as MV-HEVC, is similar to the MVC extension of H.264/AVC. Similarly to MVC, in MV-HEVC, inter-view reference pictures can be included in the reference picture list(s) of the current picture being coded or decoded. The scalable extension of HEVC, referred to as SHVC, is planned to be specified so that it uses multi-loop decoding operation (unlike the SVC extension of H.264/AVC). SHVC is reference index based, i.e. an inter-layer reference picture can be included in a one or more reference picture lists of the current picture being coded or decoded (as described above).

It is possible to use many of the same syntax structures, semantics, and decoding processes for MV-HEVC and SHVC. Other types of scalability, such as depth-enhanced video, may also be realized with the same or similar syntax structures, semantics, and decoding processes as in MV-HEVC and SHVC.

For the enhancement layer coding, the same concepts and coding tools of HEVC may be used in SHVC, MV-HEVC, and/or alike. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or alike codec.

In MV-HEVC, SHVC and/or alike, VPS may for example include a mapping of the LayerId value derived from the NAL unit header to one or more scalability dimension values, for example correspond to dependency_id, quality_id, view_id, and depth_flag for the layer defined similarly to SVC and MVC.

In MV-HEVC/SHVC, it may be indicated in the VPS that a layer with layer identifier value greater than 0 has no direct reference layers, i.e. that the layer is not inter-layer predicted from any other layer. In other words, an MV-HEVC/SHVC bitstream may contain layers that are independent of each other, which may be referred to as simulcast layers.

A part of VPS, which specifies the scalability dimensions that may be present in the bitstream, the mapping of nuh_layer_id values to scalability dimension values, and the dependencies between layers may be specified with the following syntax:

| | Descriptor |
|---|---|
| vps_extension( ) { | |
|   splitting_flag | u(1) |
|   for( i = 0, NumScalabilityTypes = 0; i < 16; i++ ) { | |
|     scalability_mask_flag[ i ] | u(1) |
|     NumScalabilityTypes += scalability_mask_flag[ i ] | |
|   } | |
|   for( j = 0; j < ( NumScalabilityTypes − splitting flag ); j++ ) | |
|     dimension_id_len_minus1[ j ] | u(3) |
|   vps_nuh_layer_id_present_flag | u(1) |
|   for( i = 1; i <= MaxLayersMinus1; i++ ) { | |
|     if( vps_nuh_layer_id_present_flag ) | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
|   } | |
|   view_id_len | u(4) |
|   if( view_id_len > 0 ) | |
|     for( i = 0; i < NumViews; i++ ) | |
|       view_id_val[ i ] | u(v) |
|   for( i = 1; i <= MaxLayersMinus1; i++ ) | |
|     for( j = 0; j < i; j++ ) | |
|       direct_dependency_flag[ i ][ j ] | u(1) |
| ... | |

The semantics of the above-shown part of the VPS may be specified as described in the following paragraphs.

splitting_flag equal to 1 indicates that the dimension_id [i][j] syntax elements are not present and that the binary representation of the nuh_layer_id value in the NAL unit header are split into NumScalabilityTypes segments with lengths, in bits, according to the values of dimension_id_len_minus1[j] and that the values of dimension_id[LayerIdxInVps[nuh_layer_id]][j] are inferred from the NumScalabilityTypes segments. splitting_flag equal to 0 indicates that the syntax elements dimension_id[i][j] are present. In the following example semantics, without loss of generality, it is assumed that splitting_flag is equal to 0.

scalability_mask_flag[i] equal to 1 indicates that dimension_id syntax elements corresponding to the i-th scalability dimension in the following table are present. scalability_mask_flag[i] equal to 0 indicates that dimension_id syntax elements corresponding to the i-th scalability dimension are not present.

| scalability mask index | Scalability dimension | ScalabilityId mapping |
|---|---|---|
| 0 | Reserved | |
| 1 | Multiview | View Order Index |
| 2 | Spatial/qualityscalability | DependencyId |

-continued

| scalability mask index | Scalability dimension | ScalabilityId mapping |
|---|---|---|
| 3 | Auxiliary | AuxId |
| 4-15 | Reserved | |

In future 3D extensions of HEVC, scalability mask index 0 may be used to indicate depth maps.

dimension_id_len_minus1[j] plus 1 specifies the length, in bits, of the dimension_id[i][j] syntax element.

vps_nuh_layer_id_present_flag equal to 1 specifies that layer_id_in_nuh[i] for i from 0 to MaxLayersMinus1 (which is equal to the maximum number of layers specified in the VPS minus 1), inclusive, are present. vps_nuh_layer_id_present_flag equal to 0 specifies that layer_id_in_nuh[i] for i from 0 to MaxLayersMinus1, inclusive, are not present.

layer_id_in_nuh[i] specifies the value of the nuh_layer_id syntax element in VCL NAL units of the i-th layer. For i in the range of 0 to MaxLayersMinus1, inclusive, when layer_id_in_nuh[i] is not present, the value is inferred to be equal to i. When i is greater than 0, layer_id_in_nuh[i] is greater than layer_id_in_nuh[i−1]. For i from 0 to MaxLayersMinus1, inclusive, the variable LayerIdxInVps[layer_id_in_nuh[i]] is set equal to i.

dimension_id[i][j] specifies the identifier of the j-th present scalability dimension type of the i-th layer. The number of bits used for the representation of dimension_id[i][j] is dimension_id_len_minus1[j]+1 bits. When splitting_flag is equal to 0, for j from 0 to NumScalabilityTypes−1, inclusive, dimension_id[0][j] is inferred to be equal to 0

The variable ScalabilityId[i][smIdx] specifying the identifier of the smIdx-th scalability dimension type of the i-th layer, the variable ViewOrderIdx[layer_id_in_nuh[i]] specifying the view order index of the i-th layer, DependencyId[layer_id_in_nuh[i]] specifying the spatial/quality scalability identifier of the i-th layer, and the variable ViewScalExtLayerFlag[layer_id_in_nuh[i]] specifying whether the i-th layer is a view scalability extension layer are derived as follows:

```
NumViews = 1
for( i = 0; i <= MaxLayersMinus1; i++ ) {
    lId = layer_id_in_nuh[ i ]
    for( smIdx= 0, j = 0; smIdx < 16; smIdx++ )
        if( scalability_mask_flag[ smIdx ] )
            ScalabilityId[ i ][ smIdx ] = dimension_id[ i ][ j++ ]
    ViewOrderIdx[ lId ] = ScalabilityId[ i ][ 1 ]
    DependencyId[ lId ] = ScalabilityId[ i ][ 2 ]
    if( i > 0 && ( ViewOrderIdx[ lId ] != ScalabilityId[ i − 1 ][ 1 ] ) )
        NumViews++
    ViewScalExtLayerFlag[ lId ] = ( ViewOrderIdx[ lId ] > 0 )
    AuxId[ lId ] = ScalabilityId[ i ][ 3 ]
}
```

Enhancement layers or layers with a layer identifier value greater than 0 may be indicated to contain auxiliary video complementing the base layer or other layers. For example, in the present draft of MV-HEVC, auxiliary pictures may be encoded in a bitstream using auxiliary picture layers. An auxiliary picture layer is associated with its own scalability dimension value, AuxId (similarly to e.g. view order index). Layers with AuxId greater than 0 contain auxiliary pictures. A layer carries only one type of auxiliary pictures, and the type of auxiliary pictures included in a layer may be indicated by its AuxId value. In other words, AuxId values may be mapped to types of auxiliary pictures. For example, AuxId equal to 1 may indicate alpha planes and AuxId equal to 2 may indicate depth pictures. An auxiliary picture may be defined as a picture that has no normative effect on the decoding process of primary pictures. In other words, primary pictures (with AuxId equal to 0) may be constrained not to predict from auxiliary pictures. An auxiliary picture may predict from a primary picture, although there may be constraints disallowing such prediction, for example based on the AuxId value. SEI messages may be used to convey more detailed characteristics of auxiliary picture layers, such as the depth range represented by a depth auxiliary layer. The present draft of MV-HEVC includes support of depth auxiliary layers.

Different types of auxiliary pictures may be used including but not limited to the following: Depth pictures; Alpha pictures; Overlay pictures; and Label pictures. In Depth pictures a sample value represents disparity between the viewpoint (or camera position) of the depth picture or depth or distance. In Alpha pictures (a.k.a. alpha planes and alpha matte pictures) a sample value represents transparency or opacity. Alpha pictures may indicate for each pixel a degree of transparency or equivalently a degree of opacity. Alpha pictures may be monochrome pictures or the chroma components of alpha pictures may be set to indicate no chromaticity (e.g. 0 when chroma samples values are considered to be signed or 128 when chroma samples values are 8-bit and considered to be unsigned). Overlay pictures may be overlaid on top of the primary pictures in displaying. Overlay pictures may contain several regions and background, where all or a subset of regions may be overlaid in displaying and the background is not overlaid. Label pictures contain different labels for different overlay regions, which can be used to identify single overlay regions.

Continuing how the semantics of the presented VPS excerpt may be specified: view_id_len specifies the length, in bits, of the view_id_val[i] syntax element. view_id_val[i] specifies the view identifier of the i-th view specified by the VPS. The length of the view_id_val[i] syntax element is view_id_len bits. When not present, the value of view_id_val[i] is inferred to be equal to 0. For each layer with nuh_layer_id equal to nuhLayerId, the value ViewId[nuhLayerId] is set equal to view_id_val[ViewOrderIdx[nuhLayerId]]. direct_dependency_flag[i][j] equal to 0 specifies that the layer with index j is not a direct reference layer for the layer with index i. direct_dependency_flag[i][j] equal to 1 specifies that the layer with index j may be a direct reference layer for the layer with index i. When direct_dependency_flag[i][j] is not present for i and j in the range of 0 to MaxLayersMinus1, it is inferred to be equal to 0.

The variable NumDirectRefLayers[iNuhLId] may be defined as the number of direct reference layers for the layer with nuh_layer_id equal to iNuhLId based on the layer dependency information. The variable RefLayerId[iNuhLId][j] may be defined as the list of nuh_layer_id values of the direct reference layers of the layer with nuh_layer_id equal to iNuhLId, where j is in the range of 0 to NumDirectRefLayers[iNuhLId]−1, inclusive, and each item j in the list corresponds to one direct reference layer. The variables NumDirectRefLayers[iNuhLId] and RefLayerId[iNuhLId][j] may be specified as follows, where MaxLayersMinus1 is equal to the maximum number of layers specified in the VPS minus 1:

```
for( i = 0; i <= MaxLayersMinus1; i++ ) {
    iNuhLId = layer_id_in_nuh[ i ]
```

```
NumDirectRefLayers[ iNuhLId ] = 0
for( j = 0; j < i; j++ )
    if( direct_dependency_flag[ i ][ j ] )
        RefLayerId[ iNuhLId ]
[ NumDirectRefLayers[ iNuhLId ]++ ] = layer_id_in_nuh[ j ]
}
```

VPS may also include information on temporal sub-layers, TemporalId-based constraints on inter-layer prediction, and other constraints on inter-layer prediction, for example using the following syntax:

```
    vps_sub_layers_max_minus1_present_flag                    u(1)
        if( vps_sub_layers_max_minus1_present_flag )
            for( i = 0; i <= MaxLayersMinus1; i++ )
                sub_layers_vps_max_minus1[ i ]                u(3)
    max_tid_ref_present_flag                                  u(1)
    if( max_tid_ref_present_flag )
        for( i = 0; i < MaxLayersMinus1; i++ )
            for( j = i + 1; j <= MaxLayersMinus1; j++ )
                if( direct_dependency_flag[ j ] [ i ] )
                    max_tid_il_ref_pics_plus1[ i ] [ j ]      u(3)
    all_ref_layers_active_flag                                u(1)
...
    max_one_active_ref_layer_flag                             u(1)
...
```

The semantics of the above excerpt of the VPS syntax may be specified as described in the following paragraphs.

vps_sub_layers_max_minus1_present_flag equal to 1 specifies that the syntax elements sub_layers_vps_max_minus1[i] are present. vps_sub_layers_max_minus1_present_flag equal to 0 specifies that the syntax elements sub_layers_vps_max_minus1[i] are not present.

sub_layers_vps_max_minus1[i] plus 1 specifies the maximum number of temporal sub-layers that may be present in the CVS for the layer with nuh_layer_id equal to layer_id_in_nuh[i]. When not present, sub_layers_vps_max_minus1[i] is inferred to be equal to vps_max_sub_layers_minus1 (which is present earlier in the VPS syntax).

max_tid_ref_present_flag equal to 1 specifies that the syntax element max_tid_il_ref_pics_plus1[i][j] is present. max_tid_ref_present_flag equal to 0 specifies that the syntax element max_tid_il_ref_pics_plus1[i][j] is not present.

max_tid_il_ref_pics_plus1[i][j] equal to 0 specifies that within the CVS non-IRAP pictures with nuh_layer_id equal to layer_id_in_nuh[i] are not used as reference for inter-layer prediction for pictures with nuh_layer_id equal to layer_id_in_nuh[j]. max_tid_il_ref_pics_plus1[i][j] greater than 0 specifies that within the CVS pictures with nuh_layer_id equal to layer_id_in_nuh[i] and TemporalId greater than max_tid_il_ref_pics_plus1[i][j]−1 are not used as reference for inter-layer prediction for pictures with nuh_layer_id equal to layer_id_in_nuh[j]. When not present, max_tid_il_ref_pics_plus1[i][j] is inferred to be equal to 7.

all_ref_layers_active_flag equal to 1 specifies that for each picture referring to the VPS, the reference layer pictures that belong to all direct reference layers of the layer containing the picture and that might be used for inter-layer prediction as specified by the values of sub_layers_vps_max_minus1[i] and max_tid_il_ref_pics_plus1[i][j] are present in the same access unit as the picture and are included in the inter-layer reference picture set of the picture. all_ref_layers_active_flag equal to 0 specifies that the above restriction may or may not apply.

max_one_active_ref_layer_flag equal to 1 specifies that at most one picture is used for inter-layer prediction for each picture in the CVS. max_one_active_ref_layer_flag equal to 0 specifies that more than one picture may be used for inter-layer prediction for each picture in the CVS.

A layer tree may be defined as a set of layers such that each layer in the set of layers is a direct or indirected predicted layer or a direct or indirect reference layer of at least one other layer in the set of layers and no layer outside the set of layers is a direct or indirected predicted layer or a direct or indirect reference layer of any layer in the set of layers. A direct predicted layer may be defined as a layer for which another layer is a direct reference layer. A direct reference layer may be defined as a layer that may be used for inter-layer prediction of another layer for which the layer is the direct reference layer. An indirect predicted layer may be defined as a layer for which another layer is an indirect reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer.

Alternatively, a layer tree may be defined as a set of layers where each layer has an inter-layer prediction relation with at least one other layer in the layer tree and no layer outside the layer tree has an inter-layer prediction relation with any layer in the layer tree.

In SHVC, MV-HEVC, and/or alike, the block level syntax and decoding process are not changed for supporting inter-layer texture prediction. Only the high-level syntax, generally referring to the syntax structures including slice header, PPS, SPS, and VPS, has been modified (compared to that of HEVC) so that reconstructed pictures (upsampled if necessary) from a reference layer of the same access unit can be used as the reference pictures for coding the current enhancement layer picture. The inter-layer reference pictures as well as the temporal reference pictures are included in the reference picture lists. The signalled reference picture index is used to indicate whether the current Prediction Unit (PU) is predicted from a temporal reference picture or an inter-layer reference picture. The use of this feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

The reference list(s) in SHVC, MV-HEVC, and/or alike may be initialized using a specific process in which the inter-layer reference picture(s), if any, may be included in the initial reference picture list(s). For example, the temporal references may be firstly added into the reference lists (L0, L1) in the same manner as the reference list construction in HEVC. After that, the inter-layer references may be added after the temporal references. The inter-layer reference pictures may be for example concluded from the layer dependency information provided in the VPS extension. The inter-layer reference pictures may be added to the initial reference picture list L0 if the current enhancement-layer slice is a P-Slice, and may be added to both initial reference picture lists L0 and L1 if the current enhancement-layer slice is a B-Slice. The inter-layer reference pictures may be added to the reference picture lists in a specific order, which can but need not be the same for both reference picture lists. For example, an opposite order of adding inter-layer reference pictures into the initial reference picture list 1 may be used compared to that of the initial reference picture list 0. For example, inter-layer reference pictures may be inserted into the initial reference picture 0 in an ascending order of nuh_layer_id, while an opposite order may be used to initialize the initial reference picture list 1.

A second example of constructing reference picture list(s) is provided in the following. Candidate inter-layer reference pictures may be for example concluded from the layer dependency information, which may be included in the VPS, for example. The encoder may include picture-level information in a bitstream and the decoder may decode picture-level information from the bitstream which ones of the candidate inter-layer reference pictures may be used as reference for inter-layer prediction. The picture-level information may for example reside in a slice header and may be referred to as an inter-layer reference picture set. For example, the candidate inter-layer reference pictures may be indexed in a certain order and one or more indexes may be included in the inter-layer reference picture set. In another example, a flag for each candidate inter-layer reference picture indicates if it may be used as an inter-layer reference picture. As above, the inter-layer reference pictures may be added to the initial reference picture list L0 if the current enhancement-layer slice is a P-Slice, and may be added to both initial reference picture lists L0 and L1 if the current enhancement-layer slice is a B-Slice. The inter-layer reference pictures may be added to the reference picture lists in a specific order, which can but need not be the same for both reference picture lists.

A third example of constructing reference picture list(s) is provided in the following. In the third example, an inter-layer reference picture set is specified in the slice segment header syntax structure as follows:

|  | Descriptor |
|---|---|
| slice_segment_header( ) { | |
| ... | |
| if(nuh_layer_id > 0 && | |
| !all_ref_layers_active_flag | |
| && | |
| NumDirectRefLayers[ nuh_layer_id ] > 0 ) { | |
| inter_layer_pred_enabled_flag | u(1) |
| if( inter_layer_pred_enabled_flag && | |
| NumDirectRefLayers[ nuh_layer_id ] > 1) { | |
| if( !max_one_active_ref_layer_flag ) | |
| num_inter_layer_ref_pics_minus1 | u(v) |
| if( NumActiveRefLayerPics != | |
| NumDirectRefLayers[ nuh_layer_id ] ) | |
| for( i = 0; i < | |
| NumActiveRefLayerPics; i++ ) | |
| inter_layer_pred_layer_idc[ i ] | u(v) |
| } | |
| } | |
| ... | |

The variable NumDirectRefLayers[layerId] has been derived to be the number of direct reference layers for the layer with nuh_layer_id equal to layerId based on the layer dependency information. In the context of MV-HEVC, SHVC, and alike, NumDirectRefLayers[layerId] may be derived based on the direct_dependency_flag[i][j] syntax elements of VPS.

The semantics of the above excerpt of the slice segment header syntax structure may be specified as described in the following paragraphs.

inter_layer_pred_enabled_flag equal to 1 specifies that inter-layer prediction may be used in decoding of the current picture. inter_layer_pred_enabled_flag equal to 0 specifies that inter-layer prediction is not used in decoding of the current picture.

num_inter_layer_ref_pics_minus1 plus 1 specifies the number of pictures that may be used in decoding of the current picture for inter-layer prediction. The length of the num_inter_layer_ref_pics_minus1 syntax element is Ceil (Log 2(NumDirectRefLayers[nuh_layer_id])) bits. The value of num_inter_layer_ref_pics_minus1 shall be in the range of 0 to NumDirectRefLayers[nuh_layer_id]−1, inclusive.

The variables numRefLayerPics and refLayerPicIdc[j] may be derived as follows:

```
for( i = 0, j = 0; i < NumDirectRefLayers[ nuh_layer_id ]; i++ ) {
    refLayerIdx = LayerIdxInVps[ RefLayerId[ nuh_layer_id ][ i ] ]
    if( sub_layers_vps_max_minus1[ refLayerIdx ] >= TemporalId &&
    max_tid_il_ref_pics_plus1[ refLayerIdx ]
    [ LayerIdxInVps[ nuh_layer_id ] ] > TemporalId )
        refLayerPicIdc[ j++ ] = i
}
numRefLayerPics = j
```

The list refLayerPicIdc[j] may be considered to indicate the candidate inter-layer reference pictures with reference to the second example above.

The variable NumActiveRefLayerPics may be derived as follows:

```
if( nuh_layer_id = = 0 || NumDirectRefLayers[ nuh_layer_id ] = = 0 )
    NumActiveRefLayerPics = 0
else if( all_ref_layers_active_flag )
    NumActiveRefLayerPics = numRefLayerPics
else if( !inter_layer_pred_enabled_flag )
    NumActiveRefLayerPics = 0
else if( max_one_active_ref_layer_flag ||
NumDirectRefLayers[ nuh_layer_id ] = = 1 )
    NumActiveRefLayerPics = 1
else
    NumActiveRefLayerPics = num_inter_layer_ref_pics_minus1 + 1
``` inter_layer_pred_layer_idc[i] specifies the variable, RefPicLayerId[i], representing the nuh_layer_id of the i-th picture that may be used by the current picture for inter-layer prediction. The length of the syntax element inter_layer_pred_layer_idc[i] is Ceil(Log 2(NumDirectRefLayers [nuh_layer_id])) bits. The value of inter_layer_pred_layer_idc[i] shall be in the range of 0 to NumDirectRefLayers [nuh_layer_id]−1, inclusive. When not present, the value of inter_layer_pred_layer_idc[i] is inferred to be equal to refLayerPicIdc[i].

The variables RefPicLayerId[i] for all values of i in the range of 0 to NumActiveRefLayerPics−1, inclusive, are derived as follows:

```
for( i = 0, j = 0; i < NumActiveRefLayerPics; i++)
    RefPicLayerId[ i ] = RefLayerId[ nuh_layer_id ]
    [ inter_layer_pred_layer_idc[ i ] ]
``` inter_layer_pred_layer_idc[i] may be considered to be picture-level information which ones of the candidate inter-layer reference pictures may be used as reference for inter-layer prediction, with reference to the second example above.

The pictures identified by variable RefPicLayerId[i] for all values of i in the range of 0 to NumActiveRefLayerPics−1, inclusive, may be included in initial reference picture lists. As above, the pictures identified by variable RefPicLayerId[i] may be added to the initial reference picture list L0 if the current enhancement-layer slice is a P-Slice, and may be added to both initial reference picture lists L0 and L1 if the current enhancement-layer slice is a B-Slice. The pictures identified by variable RefPicLayerId[i] may be added to the reference picture lists in a specific order, which can but need not be the same for both reference picture lists. For example, the derived ViewId values may affect the order of adding the pictures identified by variable RefPicLayerId[i] into the initial reference picture lists.

In the coding and/or decoding process, the inter-layer reference pictures may be treated as long term reference pictures.

A type of inter-layer prediction, which may be referred to as inter-layer motion prediction, may be realized as follows. A temporal motion vector prediction process, such as TMVP of H.265/HEVC, may be used to exploit the redundancy of motion data between different layers. This may be done as follows: when the decoded base-layer picture is upsampled, the motion data of the base-layer picture is also mapped to the resolution of an enhancement layer. If the enhancement layer picture utilizes motion vector prediction from the base layer picture e.g. with a temporal motion vector prediction mechanism such as TMVP of H.265/HEVC, the corresponding motion vector predictor is originated from the mapped base-layer motion field. This way the correlation between the motion data of different layers may be exploited to improve the coding efficiency of a scalable video coder.

In SHVC and/or alike, inter-layer motion prediction may be performed by setting the inter-layer reference picture as the collocated reference picture for TMVP derivation. A motion field mapping process between two layers may be performed for example to avoid block level decoding process modification in TMVP derivation. The use of the motion field mapping feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

In a motion field mapping process for spatial scalability, the motion field of the upsampled inter-layer reference picture may be attained based on the motion field of the respective reference layer picture. The motion parameters (which may e.g. include a horizontal and/or vertical motion vector value and a reference index) and/or a prediction mode for each block of the upsampled inter-layer reference picture may be derived from the corresponding motion parameters and/or prediction mode of the collocated block in the reference layer picture. The block size used for the derivation of the motion parameters and/or prediction mode in the upsampled inter-layer reference picture may be for example 16×16. The 16×16 block size is the same as in HEVC TMVP derivation process where compressed motion field of reference picture is used.

As discussed above, in HEVC, a two-byte NAL unit header is used for all specified NAL unit types. The NAL unit header contains one reserved bit, a six-bit NAL unit type indication (called nal_unit_type), a six-bit reserved field (called nuh_layer_id) and a three-bit temporal_id_plus1 indication for temporal level. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units.

In HEVC extensions nuh_layer_id and/or similar syntax elements in NAL unit header carries scalability layer information. For example, the LayerId value nuh_layer_id and/or similar syntax elements may be mapped to values of variables or syntax elements describing different scalability dimensions.

In scalable and/or multiview video coding, at least the following principles for encoding pictures and/or access units with random access property may be supported.

An IRAP picture within a layer may be an intra-coded picture without inter-layer/inter-view prediction. Such a picture enables random access capability to the layer/view it resides.

An IRAP picture within an enhancement layer may be a picture without inter prediction (i.e. temporal prediction) but with inter-layer/inter-view prediction allowed. Such a picture enables starting the decoding of the layer/view the picture resides provided that all the reference layers/views are available. In single-loop decoding, it may be sufficient if the coded reference layers/views are available (which can be the case e.g. for IDR pictures having dependency_id greater than 0 in SVC). In multi-loop decoding, it may be needed that the reference layers/views are decoded. Such a picture may, for example, be referred to as a stepwise layer access (STLA) picture or an enhancement layer IRAP picture.

An anchor access unit or a complete IRAP access unit may be defined to include only intra-coded picture(s) and STLA pictures in all layers. In multi-loop decoding, such an access unit enables random access to all layers/views. An example of such an access unit is the MVC anchor access unit (among which type the IDR access unit is a special case).

A stepwise IRAP access unit may be defined to include an IRAP picture in the base layer but need not contain an IRAP picture in all enhancement layers. A stepwise IRAP access unit enables starting of base-layer decoding, while enhancement layer decoding may be started when the enhancement layer contains an IRAP picture, and (in the case of multi-loop decoding) all its reference layers/views are decoded at that point.

In a scalable extension of HEVC or any scalable extension for a single-layer coding scheme similar to HEVC, IRAP pictures may be specified to have one or more of the following properties.

NAL unit type values of the IRAP pictures with nuh_layer_id greater than 0 may be used to indicate enhancement layer random access points.

An enhancement layer IRAP picture may be defined as a picture that enables starting the decoding of that enhancement layer when all its reference layers have been decoded prior to the EL IRAP picture.

Inter-layer prediction may be allowed for IRAP NAL units with nuh_layer_id greater than 0, while inter prediction is disallowed.

IRAP NAL units need not be aligned across layers. In other words, an access unit may contain both IRAP pictures and non-IRAP pictures.

After a BLA picture at the base layer, the decoding of an enhancement layer is started when the enhancement layer contains an IRAP picture and the decoding of all of its reference layers has been started. In other words, a BLA picture in the base layer starts a layer-wise start-up process.

When the decoding of an enhancement layer starts from a CRA picture, its RASL pictures are handled similarly to RASL pictures of a BLA picture (in HEVC version 1).

Scalable bitstreams with IRAP pictures or similar that are not aligned across layers may be used for example more frequent IRAP pictures can be used in the base layer, where they may have a smaller coded size due to e.g. a smaller spatial resolution. A process or mechanism for layer-wise start-up of the decoding may be included in a video decoding scheme. Decoders may hence start decoding of a bitstream when a base layer contains an IRAP picture and step-wise start decoding other layers when they contain IRAP pictures. In other words, in a layer-wise start-up of the decoding process, decoders progressively increase the number of decoded layers (where layers may represent an enhancement in spatial resolution, quality level, views, additional components such as depth, or a combination) as subsequent pictures from additional enhancement layers are decoded in the decoding process. The progressive increase of the number of decoded layers may be perceived for example as a progressive improvement of picture quality (in case of quality and spatial scalability).

A layer-wise start-up mechanism may generate unavailable pictures for the reference pictures of the first picture in decoding order in a particular enhancement layer. Alternatively, a decoder may omit the decoding of pictures preceding, in decoding order, the IRAP picture from which the decoding of a layer can be started. These pictures that may be omitted may be specifically labeled by the encoder or another entity within the bitstream. For example, one or more specific NAL unit types may be used for them. These pictures, regardless of whether they are specifically marked with a NAL unit type or inferred e.g. by the decoder, may be referred to as cross-layer random access skip (CL-RAS) pictures. The decoder may omit the output of the generated unavailable pictures and the decoded CL-RAS pictures.

A layer-wise start-up mechanism may start the output of enhancement layer pictures from an IRAP picture in that enhancement layer, when all reference layers of that enhancement layer have been initialized similarly with an IRAP picture in the reference layers. In other words, any pictures (within the same layer) preceding such an IRAP picture in output order might not be output from the decoder and/or might not be displayed. In some cases, decodable leading pictures associated with such an IRAP picture may be output while other pictures preceding such an IRAP picture might not be output.

Concatenation of coded video data, which may also be referred to as splicing, may occur for example coded video sequences are concatenated into a bitstream that is broadcast or streamed or stored in a mass memory. For example, coded video sequences representing commercials or advertisements may be concatenated with movies or other "primary" content.

Scalable video bitstreams might contain IRAP pictures that are not aligned across layers. It may, however, be convenient to enable concatenation of a coded video sequence that contains an IRAP picture in the base layer in its first access unit but not necessarily in all layers. A second coded video sequence that is spliced after a first coded video sequence should trigger a layer-wise decoding start-up process. That is because the first access unit of said second coded video sequence might not contain an IRAP picture in all its layers and hence some reference pictures for the non-IRAP pictures in that access unit may not be available (in the concatenated bitstream) and cannot therefore be decoded. The entity concatenating the coded video sequences, hereafter referred to as the splicer, should therefore modify the first access unit of the second coded video sequence such that it triggers a layer-wise start-up process in decoder(s).

Indication(s) may exist in the bitstream syntax to indicate triggering of a layer-wise start-up process. These indication(s) may be generated by encoders or splicers and may be obeyed by decoders. These indication(s) may be used for particular picture type(s) or NAL unit type(s) only, such as only for IDR pictures, while in other embodiments these indication(s) may be used for any picture type(s). Without loss of generality, an indication called cross_layer_bla_flag that is considered to be included in a slice segment header is referred to below. It should be understood that a similar indication with any other name or included in any other syntax structures could be additionally or alternatively used.

Independently of indication(s) triggering a layer-wise start-up process, certain NAL unit type(s) and/or picture type(s) may trigger a layer-wise start-up process. For example, a base-layer BLA picture may trigger a layer-wise start-up process.

A layer-wise start-up mechanism may be initiated in one or more of the following cases:

At the beginning of a bitstream.

At the beginning of a coded video sequence, when specifically controlled, e.g. when a decoding process is started or re-started e.g. as response to tuning into a broadcast or seeking to a position in a file or stream. The decoding process may input an variable, e.g. referred to as NoClrasOutputFlag, that may be controlled by external means, such as the video player or alike.

A base-layer BLA picture.

A base-layer IDR picture with cross_layer_bla_flag equal to 1. (Or a base-layer IRAP picture with cross_layer_bla_flag equal to 1.)

When a layer-wise start-up mechanism is initiated, all pictures in the DPB may be marked as "unused for reference". In other words, all pictures in all layers may be marked as "unused for reference" and will not be used as a reference for prediction for the picture initiating the layer-wise start-up mechanism or any subsequent picture in decoding order.

Cross-layer random access skipped (CL-RAS) pictures may have the property that when a layer-wise start-up mechanism is invoked (e.g. when NoClrasOutputFlag is equal to 1), the CL-RAS pictures are not output and may not be correctly decodable, as the CL-RAS picture may contain references to pictures that are not present in the bitstream. It may be specified that CL-RAS pictures are not used as reference pictures for the decoding process of non-CL-RAS pictures.

CL-RAS pictures may be explicitly indicated e.g. by one or more NAL unit types or slice header flags (e.g. by re-naming cross_layer_bla_flag to cross_layer_constraint_flag and re-defining the semantics of cross_layer_bla_flag for non-IRAP pictures). A picture may be considered as a CL-RAS picture when it is a non-IRAP picture (e.g. as determined by its NAL unit type), it resides in an enhancement layer and it has cross_layer_constraint_flag (or similar) equal to 1. Otherwise, a picture may be classified of being a non-CL-RAS picture. cross_layer_bla_flag may be inferred to be equal to 1 (or a respective variable may be set to 1), if the picture is an IRAP picture (e.g. as determined by its NAL unit type), it resides in the base layer, and cross_layer_constraint_flag is equal to 1. Otherwise, cross_layer_bla_flag may inferred to be equal to 0 (or a respective variable may be set to 0). Alternatively, CL-RAS pictures may be inferred. For example, a picture with nuh_layer_id equal to layerId may be inferred to be a CL-RAS picture when the LayerInitializedFlag[layerId] is equal to 0. A CL-RAS picture may be defined as a picture with nuh_layer_id equal to layerId such that LayerInitializedFlag[layerId] is equal to 0 when the decoding of a coded picture with nuh_layer_id greater than 0 is started.

A decoding process may be specified in a manner that a certain variable controls whether or not a layer-wise start-up process is used. For example, a variable NoClrasOutputFlag may be used, which, when equal to 0, indicates a normal decoding operation, and when equal to 1, indicates a layer-wise start-up operation. NoClrasOutputFlag may be set for example using one or more of the following steps:
1) If the current picture is an IRAP picture that is the first picture in the bitstream, NoClrasOutputFlag is set equal to 1.
2) Otherwise, if some external means are available to set the variable NoClrasOutputFlag equal to a value for a base-layer IRAP picture, the variable NoClrasOutputFlag is set equal to the value provided by the external means.
3) Otherwise, if the current picture is a BLA picture that is the first picture in a coded video sequence (CVS), NoClrasOutputFlag is set equal to 1.
4) Otherwise, if the current picture is an IDR picture that is the first picture in a coded video sequence (CVS) and cross_layer_bla_flag is equal to 1, NoClrasOutputFlag is set equal to 1.
5) Otherwise, NoClrasOutputFlag is set equal to 0.

Step 4 above may alternatively be phrased more generally for example as follows: "Otherwise, if the current picture is an IRAP picture that is the first picture in a CVS and an indication of layer-wise start-up process is associated with the IRAP picture, NoClrasOutputFlag is set equal to 1." Step 3 above may be removed, and the BLA picture may be specified to initiate a layer-wise start-up process (i.e. set NoClrasOutputFlag equal to 1), when cross_layer_bla_flag for it is equal to 1. It should be understood that other ways to phrase the condition are possible and equally applicable.

A decoding process for layer-wise start-up may be for example controlled by two array variables LayerInitializedFlag[i] and FirstPicInLayerDecodedFlag[i] which may have entries for each layer (possibly excluding the base layer and possibly other independent layers too). When the layer-wise start-up process is invoked, for example as response to NoClrasOutputFlag being equal to 1, these array variables may be reset to their default values. For example, when there 64 layers are enabled (e.g. with a 6-bit nuh_layer_id), the variables may be reset as follows: the variable LayerInitializedFlag[i] is set equal to 0 for all values of i from 0 to 63, inclusive, and the variable FirstPicInLayerDecodedFlag[i] is set equal to 0 for all values of i from 1 to 63, inclusive.

The decoding process may include the following or similar to control the output of RASL pictures. When the current picture is an IRAP picture, the following applies:
  If LayerInitializedFlag[nuh_layer_id] is equal to 0, the variable NoRaslOutputFlag is set equal to 1.
  Otherwise, if some external means is available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag.
  Otherwise, the variable HandleCraAsBlaFlag is set equal to 0 and the variable NoRaslOutputFlag is set equal to 0.

The decoding process may include the following to update the LayerInitializedFlag for a layer. When the current picture is an IRAP picture and either one of the following is true, LayerInitializedFlag[nuh_layer_id] is set equal to 1.
  nuh_layer_id is equal to 0.
  LayerInitializedFlag[nuh_layer_id] is equal to 0 and LayerInitializedFlag[refLayerId] is equal to 1 for all values of refLayerId equal to RefLayerId[nuh_layer_id][j], where j is in the range of 0 to NumDirectRefLayers[nuh_layer_id]−1, inclusive.

When FirstPicInLayerDecodedFlag[nuh_layer_id] is equal to 0, the decoding process for generating unavailable reference pictures may be invoked prior to decoding the current picture. The decoding process for generating unavailable reference pictures may generate pictures for each picture in a reference picture set with default values. The process of generating unavailable reference pictures may be primarily specified only for the specification of syntax constraints for CL-RAS pictures, where a CL-RAS picture may be defined as a picture with nuh_layer_id equal to layerId and LayerInitializedFlag[layerId] is equal to 0. In HRD operations, CL-RAS pictures may need to be taken into consideration in derivation of CPB arrival and removal times. Decoders may ignore any CL-RAS pictures, as these pictures are not specified for output and have no effect on the decoding process of any other pictures that are specified for output.

Picture output in scalable coding may be controlled for example as follows: For each picture PicOutputFlag is first derived in the decoding process similarly as for a single-layer bitstream. For example, pic_output_flag included in the bitstream for the picture may be taken into account in the derivation of PicOutputFlag. When an access unit has been decoded, the output layers and possible alternative output layers are used to update PicOutputFlag for each picture of the access unit, for example as follows:
  If the use of an alternative output layer has been enabled (e.g. AltOptLayerFlag[TargetOptLayerSetIdx] is equal to 1 in draft MV-HEVC/SHVC) and an access unit either does not contain a picture at the target output layer or contains a picture at the target output layer that has PicOutputFlag equal to 0, the following ordered steps apply:

The list nonOutputLayerPictures is the list of the pictures of the access unit with PicOutputFlag equal to 1 and with nuh_layer_id values among the nuh_layer_id values of the direct and indirect reference layers of the target output layer.

The picture with the highest nuh_layer_id value among the list nonOutputLayerPictures is removed from the list nonOutputLayerPictures.

PicOutputFlag for each picture that is included in the list nonOutputLayerPictures is set equal to 0.

Otherwise, PicOutputFlag for pictures that are not included in a target output layer is set equal to 0.

Alternatively, the condition above to trigger the output of a picture from an alternative output layer may be constrained to concern only CL-RAS pictures rather than all pictures with PicOutputFlag equal to 0. In other words, the condition may be phrased as follows:

If the use of an alternative output layer has been enabled (e.g. AltOptLayerFlag[TargetOptLayerSetIdx] is equal to 1 in draft MV-HEVC/SHVC) and an access unit either does not contain a picture at the target output layer or contains a CL-RAS picture at the target output layer that has PicOutputFlag equal to 0, the following ordered steps apply:

Alternatively, the condition may be phrased as follows:

If the use of an alternative output layer has been enabled (e.g. AltOptLayerFlag[TargetOptLayerSetIdx] is equal to 1 in draft MV-HEVC/SHVC) and an access unit either does not contain a picture at the target output layer or contains a picture with PicOutputFlag equal to 0 at the target output layer lId such that LayerInitializedFlag[lId] is equal to 0, the following ordered steps apply:

However, the scalability designs in the contemporary state of the above-described video coding standards have some limitations. For example, in SVC and SHVC, pictures (or alike) of an access unit are required to have the same temporal level (e.g. TemporalId value in HEVC and its extensions). This has the consequence that it disables encoders to determine prediction hierarchies differently across layers. Different prediction hierarchies across layers could be used to encode some layers with a greater number of TemporalId values and frequent sub-layer up-switch points and some layers with a prediction hierarchy aiming at a better rate-distortion performance. Moreover, encoders are not able to encode layer trees of the same bitstream independently from each other. For example, the base layer and an auxiliary picture layer could be encoded by different encoders, and/or encoding of different layer trees could take place at different times. However, presently layers are required to have the same (de)coding order and TemporalId of respective pictures.

A further limitation, for example in SVC and SHVC, is that temporal level switch pictures, such as TSA and STSA pictures of HEVC and its extensions, are not allowed the lowest temporal level, such as TemporalId equal to 0 in HEVC and its extensions. This has the consequence that it disables to indicate an access picture or access point to a layer that enables decoding of some temporal levels (but not necessarily all of them). However, such an access point could be used, for example, for step-wise start-up of decoding of a layer in a sub-layer-wise manner and/or bitrate adaptation.

Now in order to at least alleviate the above problems, methods for encoding and decoding restricted layer access pictures are presented hereinafter.

Figure 7:
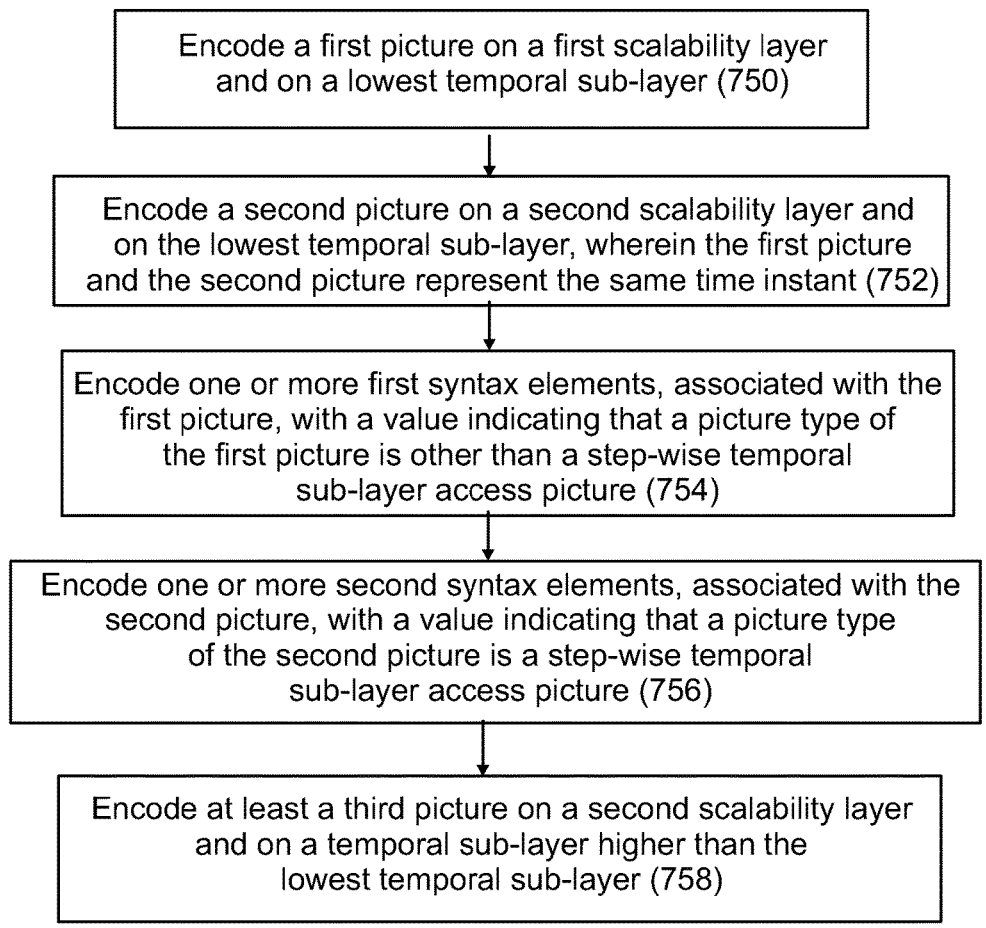
FIG. 7 shows a flow chart of an encoding method according to an embodiment of the invention.

In the encoding method, which is disclosed in FIG. 7, a first picture is encoded (750) on a first scalability layer and on a lowest temporal sub-layer, and a second picture is encoded (752) on a second scalability layer and on the lowest temporal sub-layer, wherein the first picture and the second picture represent the same time instant. Then one or more first syntax elements, associated with the first picture, are encoded (754) with a value indicating that a picture type of the first picture is other than a step-wise temporal sub-layer access picture. Similarly, one or more second syntax elements, associated with the second picture, are encoded (756) with a value indicating that a picture type of the second picture is a step-wise temporal sub-layer access picture. Then at least a third picture is encoded (758) on a second scalability layer and on a temporal sub-layer higher than the lowest temporal sub-layer.

According to an embodiment, the step-wise temporal sub-layer access picture provides an access point for layer-wise initialization of decoding of a bitstream with one or more temporal sub-layers.

Thus, the encoder encodes an access picture or access point to a layer, wherein the access picture or the access point enables decoding of some temporal sub-layers (but not necessarily all of them). Such an access point may be used for example for step-wise start-up of decoding of a layer in a sub-layer-wise manner (e.g. by a decoder) and/or bitrate adaptation (e.g. by a sender), as will be described further below.

According to an embodiment, the step-wise temporal sub-layer access picture is an STSA picture with TemporalId equal to 0.

Figure 8:
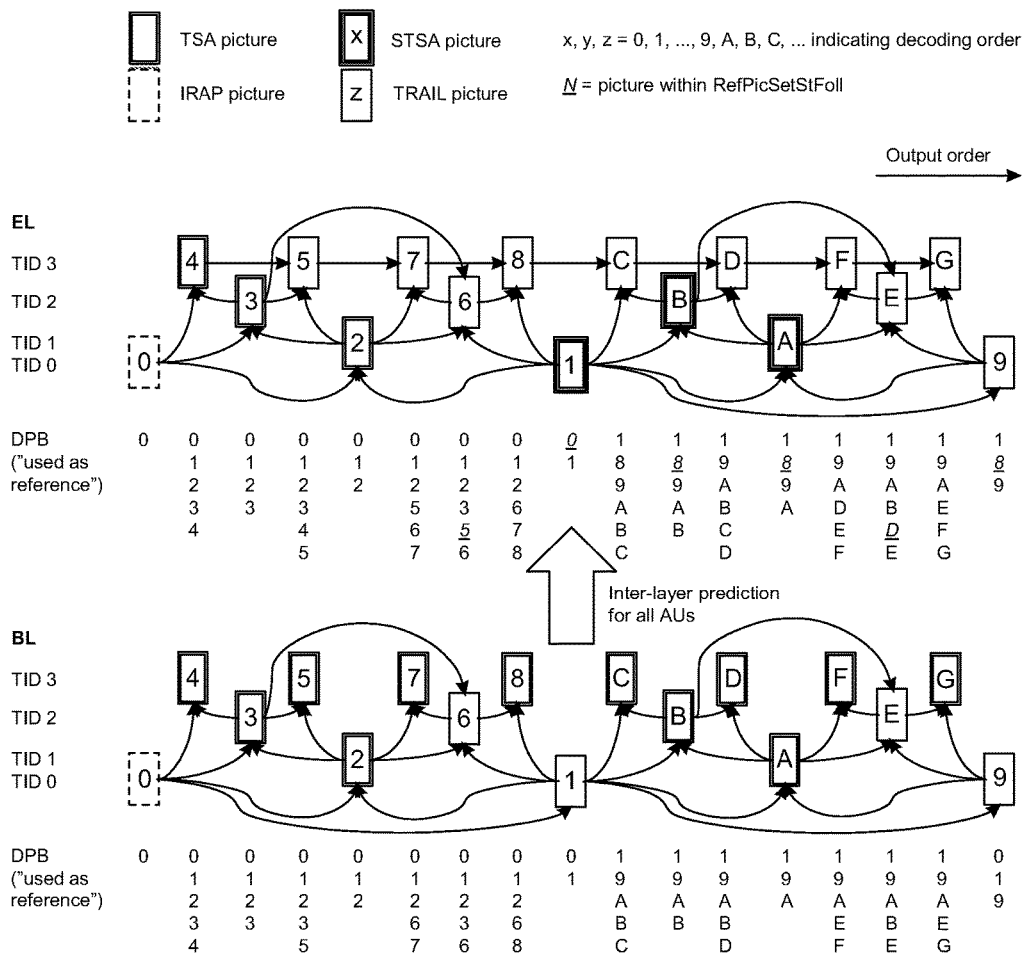
FIG. 8 illustrates an encoding example according to an embodiment of the invention.

FIG. 8 illustrates an example, where an STSA picture with TemporalId equal to 0 is used to indicate a restricted layer access picture. In FIG. 8, both the base layer (BL) and the enhancement layer (EL) comprise pictures on four temporal sub-layers (TemporalId (TID)=0, 1, 2, 3). The decoding order of the pictures is 0, 1, . . . , 9, A, B, C, . . . , whereas the output order of the pictures is the order of pictures from left to right in FIG. 8. The decoded picture buffer (DPB) state or DPB dump for each picture in FIG. 8 and subsequent figures shows the decoded pictures which are marked as "used for reference". In other words, the DPB dump considers pictures marked as "used for reference" but does not consider pictures marked as "needed for output" (which might have already been marked "unused for reference"). The DPB state may include the following pictures:

the picture in question being encoded or decoded (the bottom-most item in the indicated DPB state in FIG. 8 and in subsequent figures);

the pictures which are not used as reference for encoding (and decoding) the picture in question but may be used as reference for encoding (and decoding) subsequent pictures in decoding order (the items in the indicated DPB state with italics and underlining in FIG. 8 and subsequent figures); and the pictures that may be used as reference for encoding (and decoding) the picture in question (all other items in the indicated DPB state in FIG. 8 and subsequent figures).

The EL picture 1 is a layer access picture that provides access to sub-layers with TemporalId 0, 1, and 2 but does not provide access to sub-layer with TemporalId equal to 3. In this example there are no TSA or STSA pictures among the presented pictures (5, 7, 8, C, D, F, G) of TID 3 of the EL.

According to an embodiment, the method further comprises signaling the step-wise temporal sub-layer access picture in the bitstream by a specific NAL unit type. Thus, rather than re-using the STSA nal_unit_type, a specific NAL unit type may be taken into use and may be referred to sub-layer-constrained layer access picture.

According to an embodiment, the method further comprises signaling the step-wise temporal sub-layer access picture with an SEI message. The SEI message may also define the number of decodable sub-layers. The SEI message can be used in addition to or instead of using a NAL unit type indicating a sub-layer-constrained layer access picture or an STSA picture with TemporalId equal to 0. The SEI message may also include the number of sub-layers that can be decoded (at full picture rate) when the decoding of the layer starts from the associated layer access picture. For example, referring to the example in FIG. 8, the EL picture 1, which is a layer access picture, may be indicated to provide access to three sub-layers (TID 0, 1, 2).

According to an embodiment, the method further comprises encoding said second or any further scalability layer to comprise more frequent TSA or STSA pictures than the first scalability layer. Thereby, a sender or a decoder or alike may determine dynamically and in a layer-wise manner how many sub-layers are transmitted or decoded. When the enhancement layer contains more frequent TSA or STSA pictures than in the base layer, finer-grain bitrate adjustment can be performed than what can be achieved by determining the number of layers and/or the number sub-layers orthogonally.

It is remarked that when the alternative output layer mechanism is in use and there is no picture at the target output layer, a picture from the lower layer is to be output. Consequently, even if pictures from the target output layer are omitted from transmission, the output picture rate (of a decoder) may remain unchanged.

Figure 9:
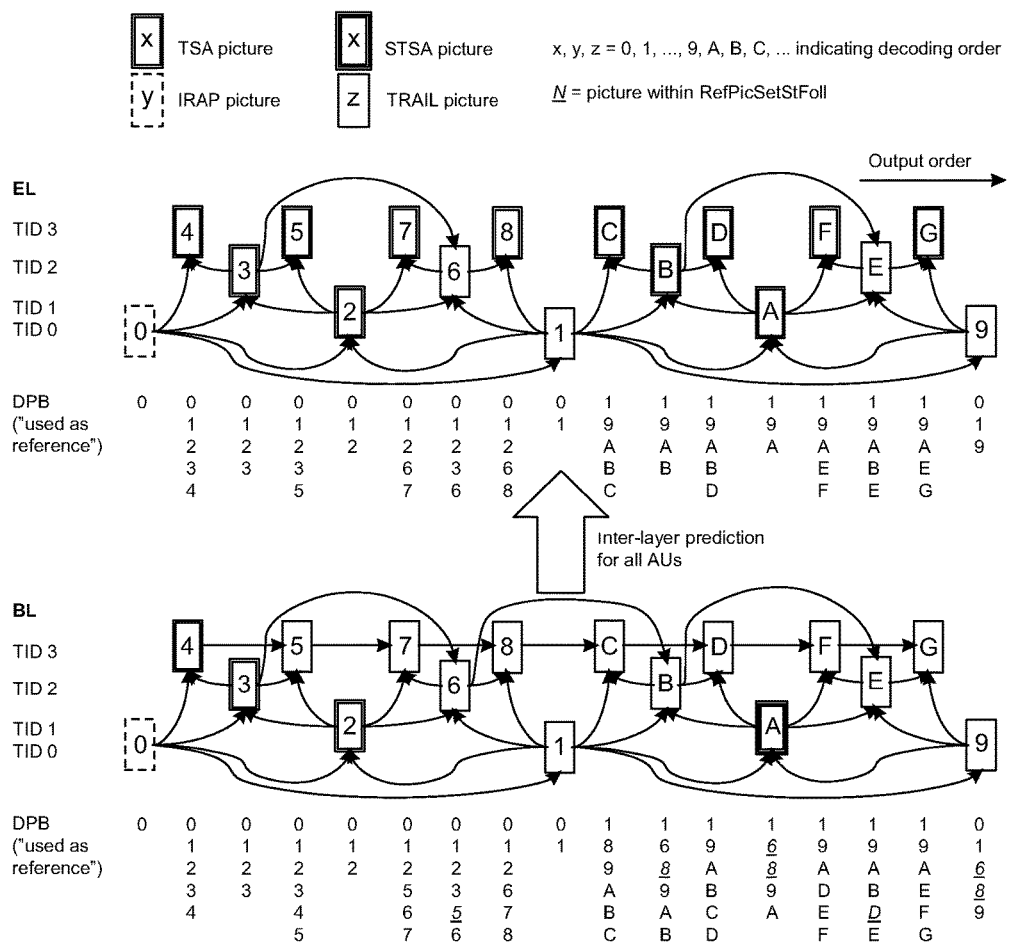
FIG. 9 illustrates an encoding example according to another embodiment of the invention.

FIG. 9 illustrates an example when the base layer BL has fewer TSA pictures (pictures 2, 3, 4) than the enhancement layer EL (pictures 2, 3, 4, 5, 7, 8, A, B, C, D, F, G). It is remarked that some prediction arrows from TID0 pictures are not included in the illustration (but can be concluded from the DPB dump).

According to an embodiment, it is possible to encode non-aligned temporal sub-layer access pictures when only certain temporal levels are used for inter-layer prediction.

In this use case, it is assumed that pictures of only some TemporalId values are used as reference for inter-layer prediction, which may be indicated in a sequence-level syntax structure, such as using the max_tid_il_ref_pics_plus1 syntax element of the VPS extension of MV-HEVC, SHVC and/or alike. It is further assumed that the sender knows that the receiver uses an output layer set, where only the EL is output. Consequently, the sender omits the transmission of BL pictures with a TemporalId value such that it is indicated not to be used as reference for inter-layer prediction. It is further assumed that the sender performs bitrate adjustment or bitrate adaptation by selecting adaptively the maximum TemporalId that is transmitted from the EL.

Figure 10:
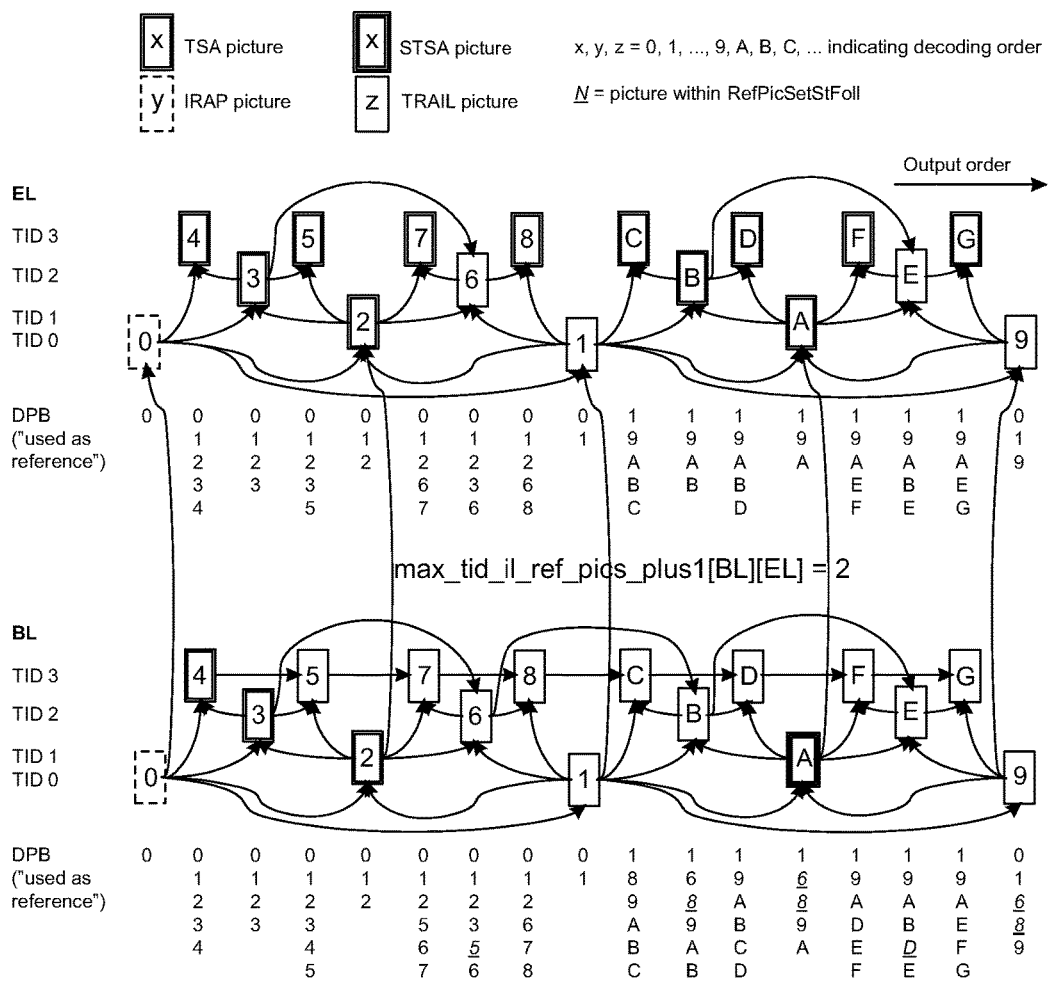
FIG. 10 illustrates an encoding example according to yet another embodiment of the invention.

FIG. 10 shows an example, which is similar to the example in FIG. 9, but where BL pictures with TemporalId greater than or equal to 2 are not used as reference for inter-layer prediction, i.e. in MV-HEVC, SHVC, and/or alike this may be indicated by setting the max_tid_il_ref_pics_plus1 syntax element between the base and enhancement layer equal to 2.

According to an embodiment, which may be applied together with or independently of other embodiments, it is possible to encode non-aligned temporal sub-layer access pictures when TemporalId need not be aligned across layers in the same access unit. This may be utilized, for example, in scalable video coding schemes allowing pictures with different TemporalId values (or alike) in the same access unit.

Having different TemporalId values for pictures in the same access unit may enable providing encoders flexibility in determining prediction hierarchies differently across layers, allowing some layers to be coded with a greater number of TemporalId values and frequent sub-layer up-switch points and some layers with a prediction hierarchy aiming at a better rate-distortion performance. Moreover, it provides flexibility to encode layer trees of the same bitstream independently from each other. For example, the base layer and an auxiliary picture layer could be encoded by different encoders, and/or encoding of different layer trees could take place at different times. By allowing encoders to operate independently from each other, the encoders have flexibility in determining a prediction hierarchy and the number of TemporalId values used according to the input signal.

The encoder may indicate e.g. in a sequence-level syntax structures, such as VPS, whether TemporalId values or alike are aligned (i.e., the same) for coded pictures within an access unit. The decoder may decode e.g. from a sequence-level syntax structure, such as VPS, an indication whether TemporalId values or alike are aligned for coded pictures within an access unit. On the basis of TemporalId values or alike being aligned for coded pictures within an access unit, the encoder and/or the decoder may choose different syntax, semantics, and/or operation than when TemporalId values or alike might not be aligned for coded pictures within an access unit. For example, when TemporalId values or alike are aligned for coded pictures within an access unit, inter-layer RPS syntax, semantics, and/or derivation in the encoding and/or the decoding may utilize information which TemporalId values the pictures used as reference for inter-layer predication between a reference layer and a predicted layer may have and/or which TemporalId values the pictures used as reference for inter-layer predication between a reference layer and a predicted layer are not allowed have. For example, a syntax element called tid_aligned_flag may be included in the VPS and its semantics may be specified as follows: tid_aligned_flag equal to 0 specifies that TemporalId may or may not be the same for different coded pictures of the same access unit. tid_aligned_flag equal to 1 specifies that TemporalId is the same for all coded pictures of the same access unit. The tid_aligned_flag may be taken into account in deriving a list of candidate inter-layer reference pictures. For example, with reference to the above-described third example of constructing reference picture list(s), the pseudo-code to specify a list identifying candidate inter-layer reference pictures, refLayerPicIdc[ ] may be specified as follows:

```
for( i = 0, j = 0; i < NumDirectRefLayers[ nuh_layer_id ]; i++ ) {
    refLayerIdx = LayerIdxInVps[ RefLayerId[ nuh_layer_id ][ i ] ]
    if( sub_layers_vps_max_minus1[ refLayerIdx ] >= TemporalId &&
      ( max_tid_il_ref_pics_plus1[ refLayerIdx ]
        [ LayerIdxInVps[ nuh_layer_id ] ] > TemporalId
        || !tid_aligned_flag ) )
            refLayerPicIdc[ j++ ] = i
}
numRefLayerPics = j
```

When TemporalId values are indicated to be aligned for all pictures in an access unit, the indicated maximum TemporalId value that may be used for inter-layer prediction affects the derivation of a list of candidate inter-layer reference pictures, i.e. only the pictures with a smaller or equal TemporalId value than the indicated maximum TemporalId value are included in the list of candidate inter-layer reference pictures. When TemporalId values may or may not be aligned for all pictures in an access unit, pictures of any TemporalId values are included in the list of candidate inter-layer reference pictures.

Figure 11:
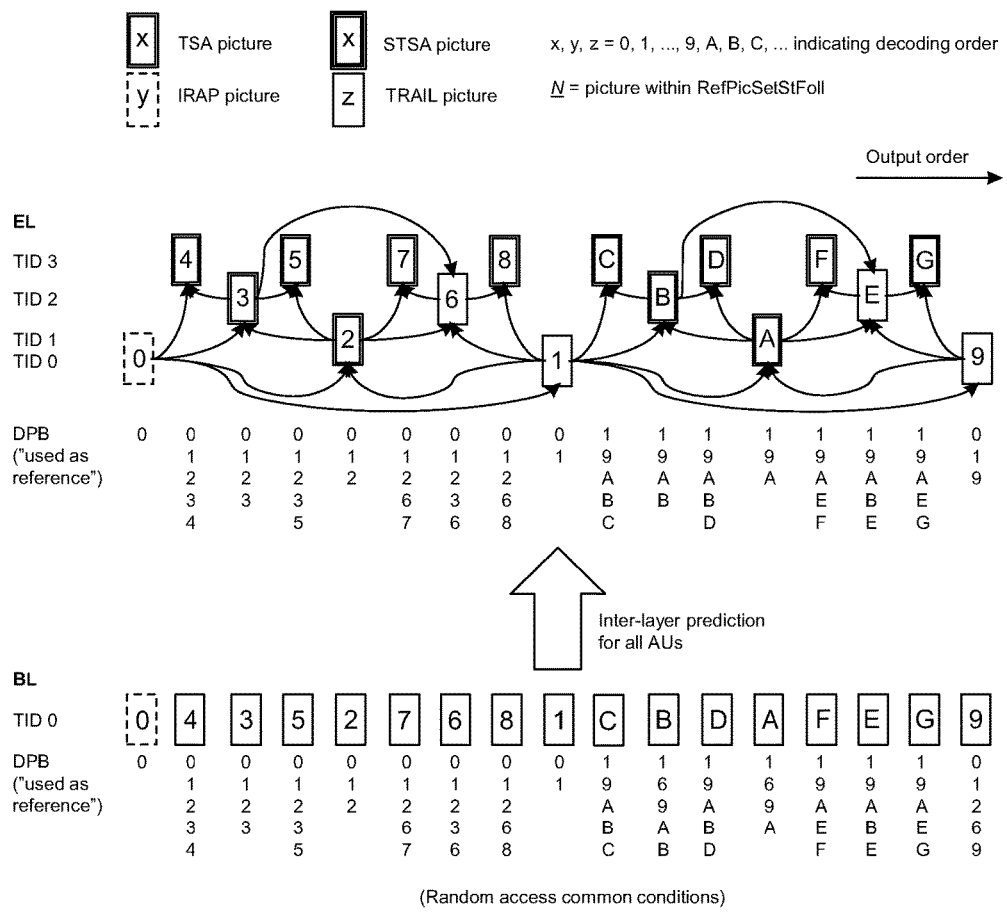
FIG. 11 illustrates an encoding example according to yet another embodiment of the invention.

FIG. 11 shows an example where prediction hierarchies are determined differently across layers. In this example, the base layer (BL) is coded with a hierarchical prediction hierarchy in which codes all pictures with TemporalId of all pictures is equal to 0. It is assumed that the prediction hierarchy used in the BL has been used to obtain a good rate-distortion performance for the base layer. The enhancement layer (EL) has four sub-layers and frequent TSA pictures, which provide the capability of dynamically selecting how many sub-layers are transmitted for the EL.

Similarly to FIG. 9, it is remarked that some prediction arrows from EL TID0 pictures are not included in the illustration of FIG. 11 (but can be concluded from the DPB dump). Likewise, the BL prediction arrows are excluded and can be concluded from the DPB dump.

An embodiment, which may be applied together with or independent of other embodiments, is described next. With reference to the presented examples of VPS syntax and semantics as well as the above-described third example of constructing reference picture list(s), the following issues have been identified:

When a list identifying candidate inter-layer reference pictures, refLayerPicIdc[ ] is derived, the condition "max_tid_il_ref_pics_plus1[refLayerIdx][LayerIdxInVps[nuh_layer_id]]>TemporalId" has the consequence that when max_tid_il_ref_pics_plus1[refLayerIdx][LayerIdxInVps[nuh_layer_id]] is equal to 0 (i.e., when only the IRAP pictures of the reference layer may be used as reference for inter-layer prediction), the index of the reference layer is not included in refLayerPicIdc[ ].

max_tid_il_ref_pics_plus1[ ][ ] is used in the inter-layer RPS syntax and semantics in a suboptimal way, because:

The syntax elements of inter-layer RPS are included in the slice header even if TemporalId is such that inter-layer prediction is disallowed according to the max_tid_il_ref_pics_plus1[ ][ ] values.

The length of the syntax elements num_inter_layer_ref_pics_minus1 and inter_layer_pred_layer_idc[i] is determined on the basis of NumDirectRefLayers[nuh_layer_id]. However, a smaller length could potentially be determined if max_tid_il_ref_pics_plus1[ ][ ] and the TemporalId of the current picture were taken into account, and accordingly inter_layer_pred_layer_idc[i] could be an index among those reference layers that can be used as reference for inter-layer prediction for the present TemporalId.

To have correct operation when only the IRAP pictures of the reference layer may be used as reference for inter-layer prediction, the pseudo-code to specify a list identifying candidate inter-layer reference pictures refLayerPicIdc[ ] may be specified as follows:

```
for( i = 0, j = 0; i < NumDirectRefLayers[ nuh_layer_id ]; i++ ) {
    refLayerIdx = LayerIdxInVps[ RefLayerId[ nuh_layer_id ][ i ] ]
    if( sub_layers_vps_max_minus1[ refLayerIdx ] >= TemporalId &&
      ( max_tid_il_ref_pics_plus1[ refLayerIdx ]
        [ LayerIdxInVps[ nuh_layer_id ] ] > TemporalId
        || TemporalId = = 0 ) )
            refLayerPicIdc[ j++ ] = i
}
numRefLayerPics = j
```

As mentioned, the presently described embodiment may be applied together with other embodiments. The presently described embodiment may be applied with an embodiment in which the encoder may encode and/or the decoder may decode e.g. into/from a sequence-level syntax structure, such as VPS, an indication whether TemporalId values or alike are aligned for coded pictures within an access unit as described in the following. To have correct operation when only the IRAP pictures of the reference layer may be used as reference for inter-layer prediction, the pseudo-code to specify a list identifying candidate inter-layer reference pictures refLayerPicIdc[ ] may be specified as follows:

```
for( i = 0, j = 0; i < NumDirectRefLayers[ nuh_layer_id ]; i++ ) {
    refLayerIdx = LayerIdxInVps[ RefLayerId[ nuh_layer_id ][ i ] ]
    if( sub_layers_vps_max_minus1[ refLayerIdx ] >= TemporalId &&
      ( max_tid_il_ref_pics_plus1[ refLayerIdx ]
        [ LayerIdxInVps[ nuh_layer_id ] ] > TemporalId
        || TemporalId = = 0 || !tid_aligned_flag ) )
            refLayerPicIdc[ j++ ] = i
}
numRefLayerPics = j
```

Alternatively, when also utilizing max_tid_il_ref_pics_plus1[ ][ ] more optimally, the embodiment may be realized as described in the following paragraphs.

The encoder may encode or the decoder may decode the inter-layer RPS related syntax elements with fixed-length coding, e.g. u(v), where the syntax element lengths may be selected according to the number of potential reference layers enabled by the nuh_layer_id value and the TemporalId value of the current picture being encoded or decoded. The syntax element values may indicate reference pictures among the potential reference layers enabled by the nuh_layer_id value and the TemporalId value. The potential reference layers may be indicated in a sequence-level syntax structure, such as VPS. The direct reference layers of each layer may be indicated separately from the sub-layers that may be used as reference for inter-layer prediction. For example, in MV-HEVC, SHVC and/or alike, the syntax elements direct_dependency_flag[i][j] may be used to indicate potential reference layers and the syntax elements max_tid_il_ref_pics_plus1[i][j] may be used to indicate whether inter-layer prediction may take place only from IRAP pictures and if that is not the case, the maximum sub-layer from which inter-layer prediction may take place.

In the context of MV-HEVC, SHVC and/or alike, the variables NumDirectRefLayersForTid[lId][tId] and RefLayerIdListForTid[lId][tId][k] are derived based on VPS extension information. NumDirectRefLayersForTid[lId][tId] indicates the number of direct reference layers which may be used for inter-layer prediction of a picture with nuh_layer_id equal to lId and TemporalId equal to tId. RefLayerIdListForTid[lId][tId][k] is a list of nuh_layer_id values of direct reference layers which may be used for inter-layer prediction of a picture with nuh_layer_id equal to lId and TemporalId equal to tId. For example, the following pseudo-code may be used to derive NumDirectRefLayersForTid[lId][tId] and RefLayerIdListForTid[lId][tId][k], where MaxLayersMinus1 is the number of layers specified in the VPS minus 1 and LayerIdxInVps[layerId] specifies the index of the layer (in the range of 0 to MaxLayersMinus1, inclusive) within some structures and loops specified in the VPS.

```
for( lIdx = 0; lIdx <= MaxLayersMinus1; lIdx++ ) {
    lId = layer_id_in_nuh[ lIdx ]
    for( tId = 0; tId < 7; tId++ ) {
        for( rCnt = 0, k = 0; rCnt < NumDirectRefLayers[ lId ];
            rCnt++ ) {
            refLayerIdx =
                LayerIdxInVps[ RefLayerId[ lId ][ rCnt ] ]
            if( sub_layers_vps_max_minus1[ refLayerIdx ] >=
                tId &&
                ( max_tid_il_ref_pics_plus1[ refLayerIdx ]
                [ lIdx ] > tId || tId = = 0 ) )
                RefLayerIdListForTid[ lId ][ tId ][ k++ ] =
                    RefLayerId[ lId ][ rCnt ]
        }
        NumDirectRefLayersForTid[ lId ][ tId ] = k
    }
}
```

As mentioned, the presently described embodiment may be applied together with other embodiments. The presently described embodiment may be applied with an embodiment in which the encoder may encode and/or the decoder may decode e.g. into/from a sequence-level syntax structure, such as VPS, an indication whether TemporalId values or alike are aligned for coded pictures within an access unit as described in the following. To have correct operation when only the TRAP pictures of the reference layer may be used as reference for inter-layer prediction, the pseudo-code to derive NumDirectRefLayersForTid[lId][tId] and RefLayerIdListForTid[lId][tId][k] may be specified as follows:

```
for( lIdx = 0; lIdx <= MaxLayersMinus1; lIdx++ ) {
    lId = layer_id_in_nuh[ lIdx ]
    for( tId = 0; tId < 7; tId++ ) {
        for( rCnt = 0, k = 0; rCnt < NumDirectRefLayers[ lId ];
            rCnt++ ) {
            refLayerIdx =
                rLayerIdxInVps[ RefLayerId[ lId ][ rCnt ] ]
            if( sub_layers_vps_max_minus1[ refLayerIdx ] >=
                tId &&
                ( max_tid_il_ref_pics_plus1[ refLayerIdx ]
                [ lIdx ] > tId || tId = = 0 || !tid_aligned_flag ) )
                RefLayerIdListForTid[ lId ][ tId ][ k++ ] =
                    RefLayerId[ lId ][ rCnt ]
        }
        NumDirectRefLayersForTid[ lId ][ tId ] = k
    }
}
```

NumDirectRefLayersForTid[nuh_layer_id][TemporalId] is used instead NumDirectRefLayers[nuh_layer_id] in the inter-layer RPS syntax and semantics. Moreover, inter_layer_pred_layer_idc[i] is an index k to RefLayerIdListForTid[nuh_layer_id][TemporalId][k] (rather than an index k to RefLayerId[nuh_layer_id][k]). As a consequence, the syntax elements of inter-layer RPS are included in the slice header only if TemporalId is such that inter-layer prediction is disallowed according to the max_tid_il_ref_pics_plus1[ ][ ] values. Moreover, the length of the syntax elements num_inter_layer_ref_pics_minus1 and inter_layer_pred_layer_idc[i] is determined on the basis of NumDirectRefLayersForTid[nuh_layer_id][TemporalId] and hence may be shorter than if the lengths were determined on the basis of NumDirectRefLayers[nuh_layer_id].

For example, the following syntax may be used in the slice segment header syntax structure:

```
if( nuh_layer_id > 0 && !all_ref_layers_active_flag &&
    NumDirectRefLayersForTid[ nuh_layer_id ][ TemporalId
    ] > 0 ) {
    inter_layer_pred_enabled_flag                         u(1)
    if( inter_layer_pred_enabled_flag &&
        NumDirectRefLayersForTid[ nuh_layer_id ][
        TemporalId ] > 1) {
        if( !max_one_active_ref_layer_flag )
            num_inter_layer_ref_pics_minus1               u(v)
        if( NumActiveRefLayerPics !=
            NumDirectRefLayersForTid[ nuh_layer_id ][ TemporalId
            ] )
            for( i = 0; i < NumActiveRefLayerPics; i++ )
                inter_layer_pred_layer_idc[ i ]           u(v)
    }
}
```

The semantics of the above except of the slice segment header syntax structure may be specified as described in the following paragraphs.

num_inter_layer_ref_pics_minus1 plus 1 specifies the number of pictures that may be used in decoding of the current picture for inter-layer prediction. The length of the num_inter_layer_ref_pics_minus1 syntax element is Ceil (Log 2(NumDirectRefLayersForTid[nuh_layer_id][TemporalId])) bits. The value of num_inter_layer_ref_pics_minus1 shall be in the range of 0 to NumDirectRefLayersForTid[nuh_layer_id][TemporalId]−1, inclusive.

The variable NumActiveRefLayerPics may be derived as follows:

```
if( nuh_layer_id = = 0 ||
    NumDirectRefLayersForTid[ nuh_layer_id ][ TemporalId ] = = 0 )
    NumActiveRefLayerPics = 0
else if( all_ref_layers_active_flag )
    NumActiveRefLayerPics = numRefLayerPics
else if( !inter_layer_pred_enabled_flag )
    NumActiveRefLayerPics = 0
else if( max_one_active_ref_layer_flag ||
    NumDirectRefLayersForTid[ nuh_layer_id ][ TemporalId ] = = 1 )
    NumActiveRefLayerPics = 1
else
    NumActiveRefLayerPics = num_inter_layer_ref_pics_minus1 + 1
``` inter_layer_pred_layer_idc[i] specifies the variable, RefPicLayerId[i], representing the nuh_layer_id of the i-th picture that may be used by the current picture for inter-layer prediction. The length of the syntax element inter_layer_pred_layer_idc[i] is Ceil(Log 2(NumDirectRefLayersForTid[nuh_layer_id][TemporalId])) bits. The value of inter_layer_pred_layer_idc[i] shall be in the range of 0 to NumDirectRefLayersForTid[nuh_layer_id][TemporalId]−1, inclusive. When not present, the value of inter_layer_pred_layer_idc[i] is inferred to be equal to refLayerPicIdc[i].

The variables RefPicLayerId[i] for all values of i in the range of 0 to NumActiveRefLayerPics−1, inclusive, may be derived as follows:

```
for( i = 0, j = 0; i < NumActiveRefLayerPics; i++)
    RefPicLayerId[ i ] = RefLayerIdListForTid
        [ nuh_layer_id ][ TemporalId ]
        [ inter_layer_pred_layer_idc[ i ] ]
```

In the case of hybrid codec scalability, a decoded picture of an external base layer may be provided for encoding and/or decoding of the enhancement layers, e.g. to serve as a reference for inter-layer prediction. In some embodiments, it may be required, for example in a coding standard, that the TemporalId values of the coded pictures in an access unit are the same, and the TemporalId value of the external base layer picture may be inferred to be equal to the TemporalId value of the pictures of the access unit which the external base layer picture is associated with. In some embodiments, it may be indicated, for example using the tid_aligned_flag or alike, whether the TemporalId values of the coded pictures in an access unit are required to be the same. When tid_aligned_flag or alike indicates that the TemporalId values of the coded pictures in an access unit are the same, the TemporalId value of the external base layer picture is inferred to be equal to the TemporalId value of the pictures of the access unit which the external base layer picture is associated with. Otherwise, the TemporalId value of the external base layer picture might not have an impact in the encoding or decoding of the pictures in the access unit which the external base layer is associated with and hence a TemporalId value for the external base layer picture needs not be derived. In some embodiments, the TemporalId value of the external base layer picture may be inferred to be equal to the TemporalId value of a selected picture in the access unit which the external base layer picture is associated with. The selected picture may be selected according to constraints and/or an algorithm, which may be specified for example in a coding standard. For example, the selected picture may be a picture for which the external base layer picture is a direct reference picture. If there are multiple pictures for which the external base layer picture is a direct reference picture, for example the one having the smallest nuh_layer_id value may be selected. There may be additional constraints on the TemporalId values of the pictures for an access unit which has an associated external base layer picture. For example, it may be required, e.g. by a coding standard, that the TemporalId values of each picture which use or may use the external base layer as an inter-layer reference picture has to be the same. Consequently, the TemporalId value of the external base layer picture may be derived from any picture for which the external base layer picture is a direct reference picture.

Figure 12:
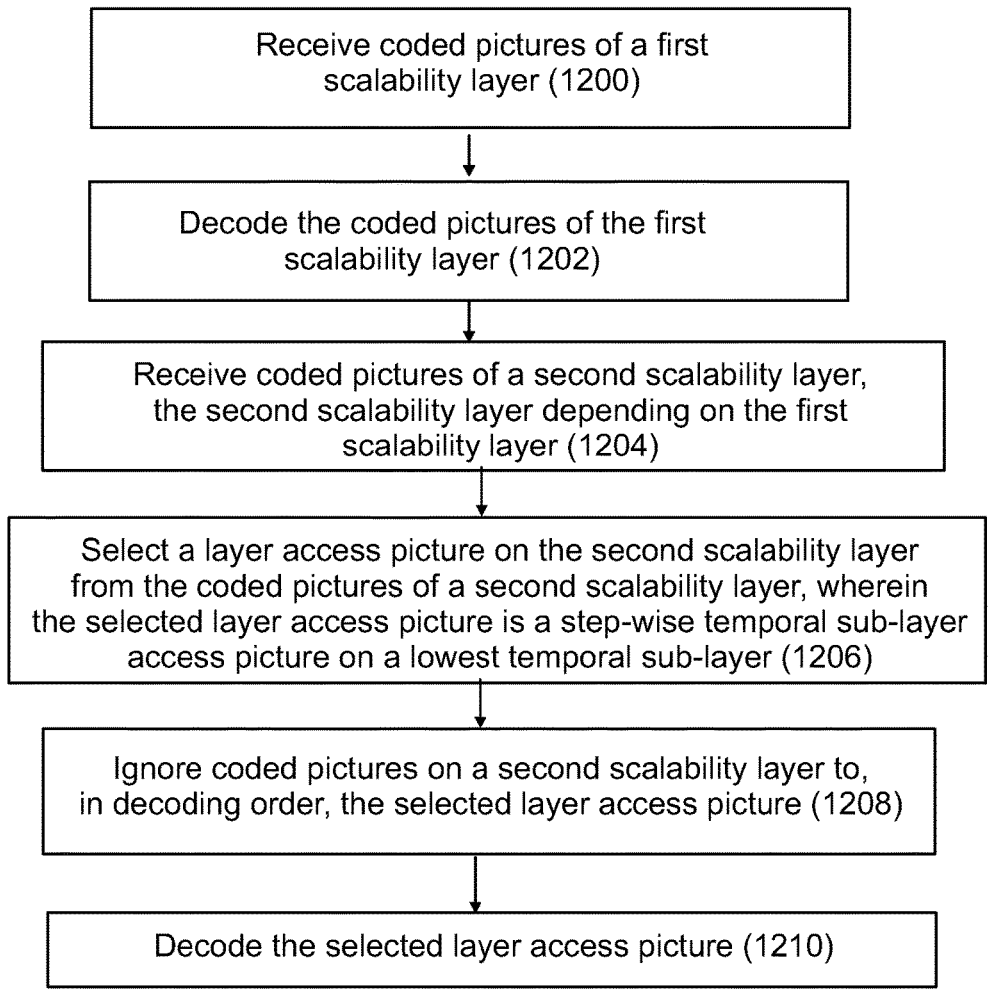
FIG. 12 shows a flow chart of a decoding method according to an embodiment of the invention.

A decoding method, which is disclosed in FIG. 12, utilizes a bitstream encoded according to any of the embodiments described above. As shown in FIG. 12, coded pictures of a first scalability layer are received (1200) and decoded (1202). Coded pictures of a second scalability layer are received (1204), wherein the second scalability layer depends on the first scalability layer. Then a layer access picture on the second scalability layer is selected (1206) from the coded pictures of a second scalability layer, wherein the selected layer access picture is a step-wise temporal sub-layer access picture on a lowest temporal sub-layer. Coded pictures on a second scalability layer prior to, in decoding order, the selected layer access picture are ignored (1208), and the selected layer access picture is decoded (1210).

Figure 13:
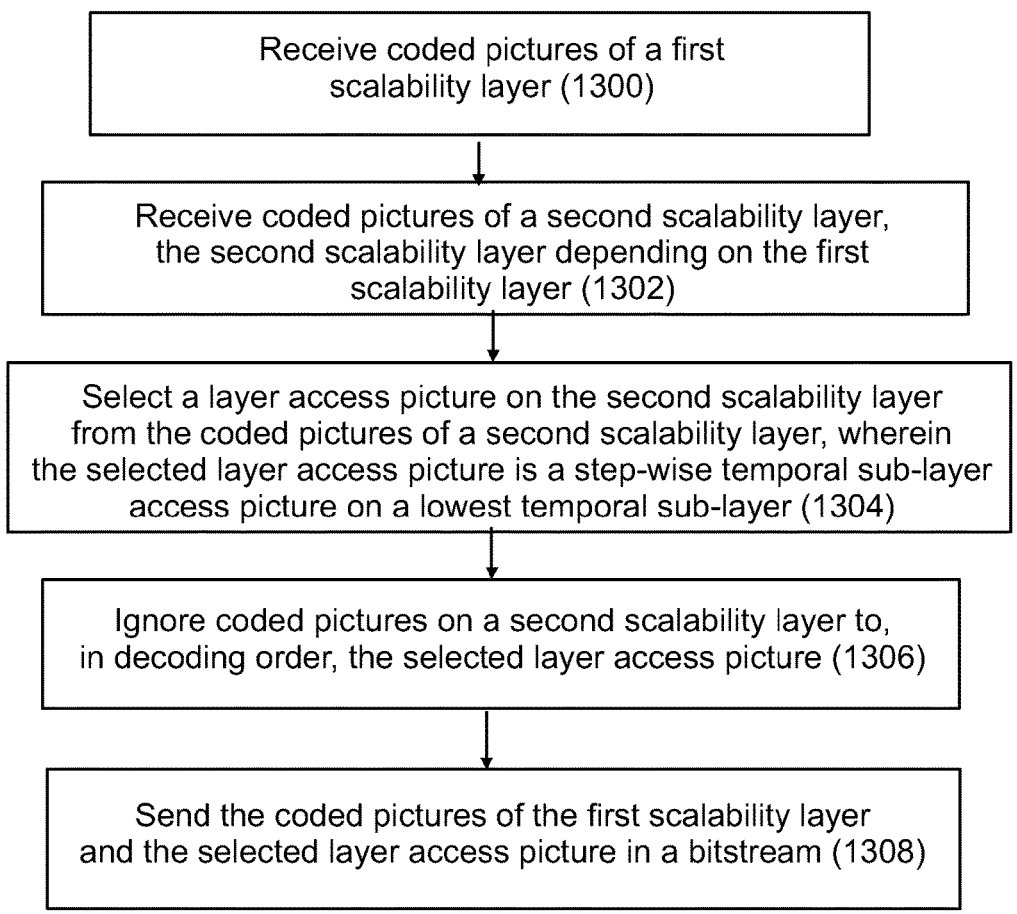
FIG. 13 shows a flow chart of a bitrate adaptation method according to an embodiment of the invention.

In an embodiment, the method of FIG. 13 may be appended in subsequent steps to those presented in FIG. 13 as follows. The number of sub-layers the decoding of which is enabled by the selected layer access picture may be concluded. Then, pictures following, in decoding order, the selected layer access picture on those sub-layers whose decoding is enabled are sent, whereas pictures following, in decoding order, the selected layer access picture on those sub-layers whose decoding is not enabled are ignored until a suitable sub-layer access picture is reached.

In addition to or instead of decoding, a bitstream encoded according to any of the embodiments described above may be utilized in bitrate adaptation by a sending apparatus (e.g. a streaming server) and/or by a gateway apparatus. In the bitrate adaptation method, which is shown in FIG. 13, coded pictures of a first scalability layer are received (1300). Coded pictures of a second scalability layer are also received (1302), wherein the second scalability layer depends on the first scalability layer. A layer access picture on the second scalability layer is selected (1304) from the coded pictures of a second scalability layer, wherein the selected layer access picture is a step-wise temporal sub-layer access picture on the lowest temporal sub-layer. Coded pictures on a second scalability layer prior to, in decoding order, the selected layer access picture are ignored (1306), and the coded pictures of the first scalability layer and the selected layer access picture are sent (1308) in a bitstream.

In an embodiment, the decoding method of FIG. 12 may be appended in subsequent steps to those presented in FIG. 12 as follows. The number of sub-layers the decoding of which is enabled by the selected layer access picture may be concluded. Then, pictures following, in decoding order, the selected layer access picture on those sub-layers whose decoding is enabled are decoded, whereas pictures following, in decoding order, the selected layer access picture on those sub-layers whose decoding is not enabled are ignored until a suitable sub-layer access picture is reached.

According to an embodiment, the layer access picture is the step-wise temporal sub-layer access picture, which depending on the use case, provides an access point either for layer-wise initialization of decoding of a bitstream with one or more temporal sub-layers or for layer-wise bitrate adaptation of a bitstream with one or more temporal sub-layers.

The decoding process may be carried out as a joint sub-layer-wise and layer-wise start-up process for decoding presented. This decoding start-up process enables sub-layer-wise initialization of decoding of a bitstream with one or more layers.

Thus, according to an embodiment, the method further comprises starting decoding of the bitstream in response to a base layer containing an IRAP picture or an STSA picture on the lowest sub-layer; starting step-wise decoding of at least one enhancement layer in response to said at least one enhancement layer contains IRAP pictures; and increasing progressively the number of decoded layers and/or the number of decoded temporal sub-layers. Herein, the layers may represent an enhancement along any scalability dimension or dimensions, such as those described earlier, e.g. an enhancement in spatial resolution, quality level, views, additional components such as depth, or a combination of any of above.

According to an embodiment, the method further comprises generating unavailable pictures for reference pictures of a first picture in decoding order in a particular enhancement layer.

According to an alternative embodiment, the method further comprises omitting the decoding of pictures preceding, in decoding order, the TRAP picture from which the decoding of a particular enhancement layer can be started. According to an embodiment, said omitted pictures may be labeled by one or more specific NAL unit types. These pictures, regardless of whether they are specifically marked with a NAL unit type or inferred e.g. by the decoder, may be referred to as cross-layer random access skip (CL-RAS) pictures.

The decoder may omit the output of the generated unavailable pictures and/or the decoded CL-RAS pictures.

According to an embodiment, the method further comprises maintaining information which sub-layers of each layer have been correctly decoded (i.e. have been initialized). For example, instead of LayerInitializedFlag[i] used in the layer-wise start-up process presented earlier, a variable HighestTidPlus1InitializedForLayer[i] may be maintained for each layer identifier i. HighestTidPlus1InitializedForLayer[i] equal to 0 may indicate that no pictures have been correctly decoded in layer with identifier i since the start-up mechanism was last started. HighestTidPlus1InitializedForLayer[i]−1 greater than or equal to 0 may indicate the highest TemporalId value that of the pictures that have been correctly decoded since the start-up mechanism was last started.

A start-up process may be initiated similarly or identically to what was described earlier for the layer-wise start-up mechanism. When a layer-wise start-up mechanism is initiated, all pictures in the DPB may be marked as "unused for reference". In other words, all pictures in all layers may be marked as "unused for reference" and will not be used as a reference for prediction for the picture initiating the layer-wise start-up mechanism or any subsequent picture in decoding order.

A decoding process for a start-up may be for example controlled by two array variables HighestTidPlus1InitializedForLayer[i] and FirstPicInLayerDecodedFlag[i] which may have entries for each layer (possibly excluding the base layer and possibly other independent layers too). When the start-up process is invoked, for example as response to NoClrasOutputFlag being equal to 1, these array variables may be reset to their default values. For example, when there 64 layers are enabled (e.g. with a 6-bit nuh_layer_id), the variables may be reset as follows: the variable HighestTidPlus1InitializedForLayer[i] is set equal to 0 for all values of i from 0 to 63, inclusive, and the variable FirstPicInLayerDecodedFlag[i] is set equal to 0 for all values of i from 1 to 63, inclusive.

The decoding process may include the following or similar to control the output of RASL pictures. When the current picture is an IRAP picture, the following applies:
   If HighestTidPlus1InitializedForLayer[nuh_layer_id] is equal to 0, the variable NoRaslOutputFlag is set equal to 1.
   Otherwise, if some external means is available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag.
   Otherwise, the variable HandleCraAsBlaFlag is set equal to 0 and the variable NoRaslOutputFlag is set equal to 0.

According to an embodiment, starting the step-wise decoding comprises one or more of the following conditional operations:
   when a current picture is an IRAP picture and decoding of all reference layers of the IRAP picture has been started, the IRAP picture and all pictures following it, in decoding order, in the same layer are decoded.
   when the current picture is an STSA picture at the lowest sub-layer and decoding of the lowest sub-layer of all reference layers of the STSA picture has been started, the STSA picture and all pictures at the lowest sub-layer following the STSA picture, in decoding order, in the same layer are decoded.
   when the current picture is a TSA or STSA picture at a higher sub-layer than the lowest sub-layer and decoding of the next lower sub-layer in the same layer has been started, and decoding of the same sub-layer of all the reference layers of the TSA or STSA picture has been started, the TSA or STSA picture and all pictures at the same sub-layer following the TSA or STSA picture, in decoding order, in the same layer are decoded.

These conditional operations may be specified in more details for example as follows. The decoding process may include the following to update the HighestTidPlus1InitializedForLayer for a layer. When the current picture is an IRAP picture and either one of the following is true, HighestTidPlus1InitializedForLayer[nuh_layer_id] is set equal to a maximum TemporalId value plus 1 (where the maximum TemporalId value may be e.g. specified in the VPS or pre-defined in a coding standard).
   nuh_layer_id is equal to 0.
   HighestTidPlus1InitializedForLayer[nuh_layer_id] is equal to 0 and HighestTidPlus1InitializedForLayer[refLayerId] is equal to the maximum TemporalId value plus 1 for all values of refLayerId equal to RefLayerId[nuh_layer_id][j], where j is in the range of 0 to NumDirectRefLayers[nuh_layer_id]−1, inclusive.

When the current picture is an STSA picture with TemporalId equal to 0 and either one of the following is true, HighestTidPlus1InitializedForLayer[nuh_layer_id] is set equal to 1.
   nuh_layer_id is equal to 0.
   HighestTidPlus1InitializedForLayer[nuh_layer_id] is equal to 0 and HighestTidPlus1InitializedForLayer[refLayerId] is greater than 0 for all values of refLayerId equal to RefLayerId[nuh_layer_id][j], where j is in the range of 0 to NumDirectRefLayers[nuh_layer_id]−1, inclusive.

When the current picture is a TSA picture or an STSA picture with TemporalId greater than 0 and both of the following are true, HighestTidPlus1InitializedForLayer[nuh_layer_id] is set equal to TemporalId+1.
   HighestTidPlus1InitializedForLayer[nuh_layer_id] is equal to TemporalId.
   HighestTidPlus1InitializedForLayer[refLayerId] is greater than or equal to TemporalId+1 for all values of refLayerId equal to RefLayerId[nuh_layer_id][j], where j is in the range of 0 to NumDirectRefLayers[nuh_layer_id]−1, inclusive.

When FirstPicInLayerDecodedFlag[nuh_layer_id] is equal to 0, the decoding process for generating unavailable reference pictures may be invoked prior to decoding the current picture. The decoding process for generating unavailable reference pictures may generate pictures for each picture in a reference picture set with default values. The process of generating unavailable reference pictures may be primarily specified only for the specification of syntax constraints for CL-RAS pictures, where a CL-RAS picture may be defined as a picture with nuh_layer_id equal to layerId and LayerInitializedFlag[layerId] is equal to 0. In HRD operations, CL-RAS pictures may need to be taken into consideration in derivation of CPB arrival and removal times. Decoders may ignore any CL-RAS pictures, as these pictures are not specified for output and have no effect on the decoding process of any other pictures that are specified for output.

A picture having such nuh_layer_id (or alike) and TemporalId (or alike) for which decoding has not yet been initialized may be handled by a decoder in a manner that it is not output by the decoder. Decoding of nuh_layer_id (or alike) with any TemporalId (or alike) value may be considered initialized when there is an TRAP picture with that nuh_layer_id value and the decoding of all the direct reference layers of the layer with that nuh_layer_id value have been initialized. Decoding of nuh_layer_id (or alike) and TemporalId (or alike) may be considered initialized when there is a TSA or STSA picture (or alike) with that nuh_layer_id value and that TemporalId value, and the decoding of all the direct reference layers of the layer with that nuh_layer_id value and that Temporal value have been initialized, and (when TemporalId is greater than 0) the decoding of the layer with that nuh_layer_id value and that TemporalId value minus 1 has been initialized. In the context of MV-HEVC, SHVC and/or alike, the controlling of the output of a picture may be specified as follows or in a similar manner. A picture with TemporalId equal to subLayerId and nuh_layer_id equal to layerId may be determined to be output (e.g. by setting PicOutputFlag equal to 1) by the decoder if HighestTidPlus1InitializedForLayer[layerId] is greater than subLayerId at the start of decoding the picture. Otherwise, the picture may be determined not to be output (e.g. by setting PicOutputFlag equal to 0) by the decoder. The determination of a picture to be output may further be affected by whether layerId is among the output layers of the target output layer set and/or whether a picture to be output is among alternative output layers if a picture at an associated output layer is not present or is not to be output.

Cross-layer random access skipped (CL-RAS) pictures may be defined to be pictures with TemporalId equal to subLayerId and nuh_layer_id equal to layerId for which HighestTidPlus1InitializedForLayer[layerId] is greater than subLayerId at the start of decoding the picture. CL-RAS pictures may have the property that they are not output and may not be correctly decodable, as the CL-RAS picture may contain references to pictures that are not present in the bitstream. It may be specified that CL-RAS pictures are not used as reference pictures for the decoding process of non-CL-RAS pictures.

According to an embodiment, a layer access picture may be encoded by an encoder to a bitstream that contains only one layer. For example, a layer access picture may be an STSA picture with nuh_layer_id equal to 0 and TemporalId equal to 0.

According to an embodiment, the decoder may start decoding from a layer access picture at the lowest layer. For example, the decoder may start decoding from an STSA with nuh_layer_id equal to 0 and TemporalId equal to 0. The decoding may comprise a sub-layer-wise start-up, for example as described above. For example, the decoding may comprise maintaining information which sub-layers of each layer have been correctly decoded (i.e. have been initialized) and switching to the next available sub-layer or layer when a suitable layer access picture, sub-layer access picture, or TRAP picture is available in decoding order. The bitstream being decoded may comprise only one layer or it may comprise several layers.

The utilization of the embodiments in bitrate adaptation is discussed in view of several examples.

Figure 14:
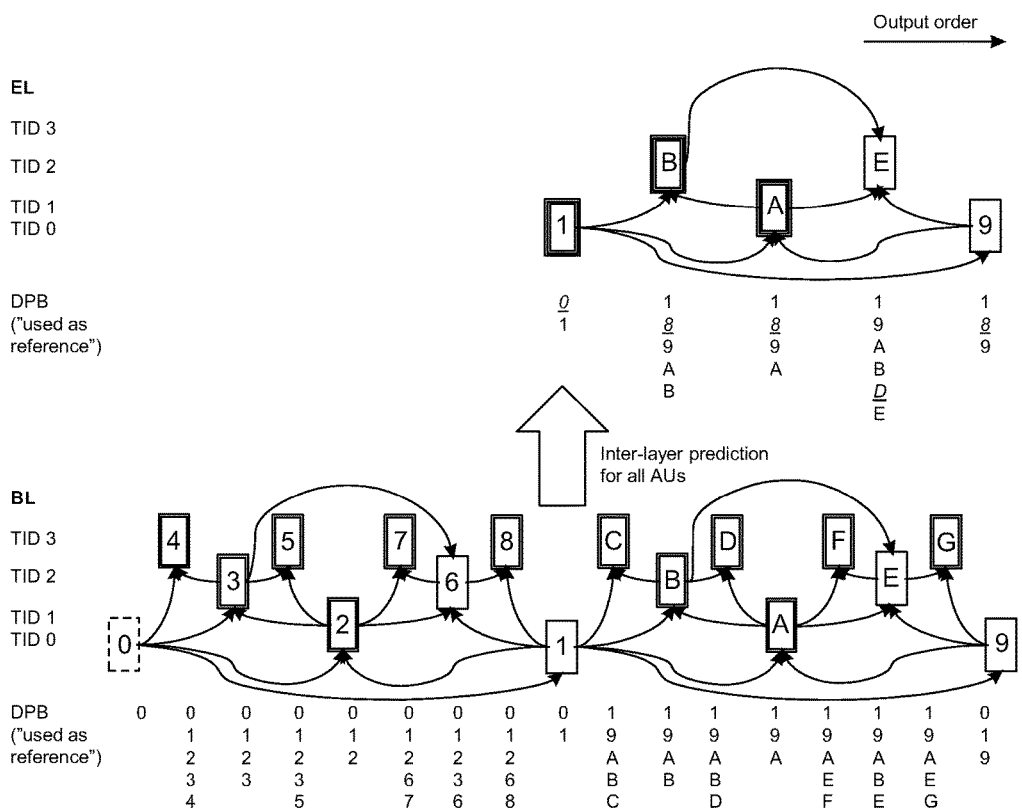
FIG. 14 illustrates a bitrate adaptation example according to an embodiment of the invention.

In FIG. 14, it is assumed that the bitstream has been encoded as shown in FIG. 8 and that the sender performs bitrate adjustment by selecting adaptively the maximum TemporalId that is transmitted from the EL. For the first GOP, no EL pictures are transmitted. For the second GOP, the sender determines to increase the video bitrate and transmits as many EL sub-layers as possible. As there are STSA pictures available at TID 0, 1 and 2 (i.e. pictures 1, A and B, respectively), the sender switches up to transmit sub-layers with TID 0 to 2 starting from the second GOP of the EL. Switching up to TID 3 of the enhancement layer can take place later, when there is an EL IRAP picture or an EL TSA or STSA picture with TID equal to 3. It is noted that if the use of alternative output layers is enabled, pictures would be output constantly at "full" picture rate in this example.

If the bitstream has been encoded such that at least one enhancement layer comprises more frequent TSA or STSA pictures than the base layer, for example as shown in FIG. 9, the sender may dynamically adapt the bitrate of the transmission in a layer-wise manner by determining how many sub-layers are transmitted.

Bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adjustment is also used when matching the transmitted stream bitrate with the prevailing channel throughput bitrate. In this use case it is possible to use a greater number of reference pictures in the base layer to achieve better rate-distortion performance.

Figure 15:
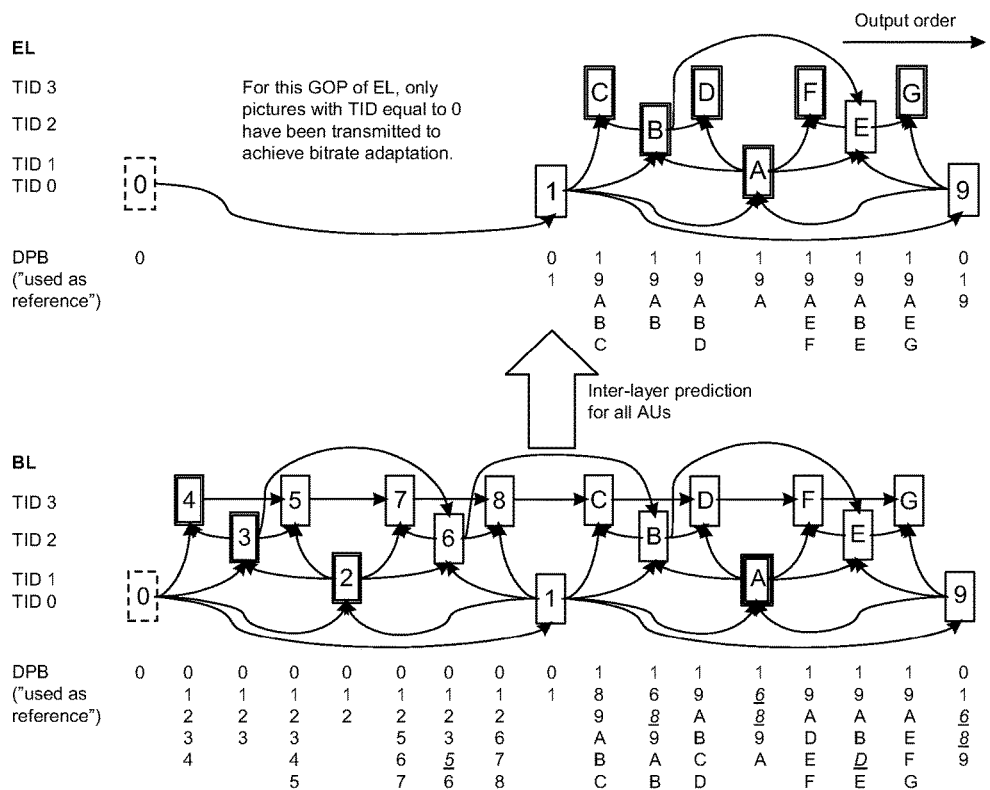
FIG. 15 illustrates a bitrate adaptation example according to another embodiment of the invention.

In the example of FIG. 15, it is assumed that the bitstream has been encoded as shown in FIG. 9 and that it has been necessary to reduce the bitrate of the first GOP when the bitstream is transmitted. In this example, only the pictures with TemporalId (TID) equal to 0 are transmitted for the first GOP. It is further assumed that the bitstream can be transmitted at its full bitrate starting from the second GOP. As the second GOP in EL starts with TSA pictures, it is possible to start transmitting EL pictures with all TID values.

Figure 16:
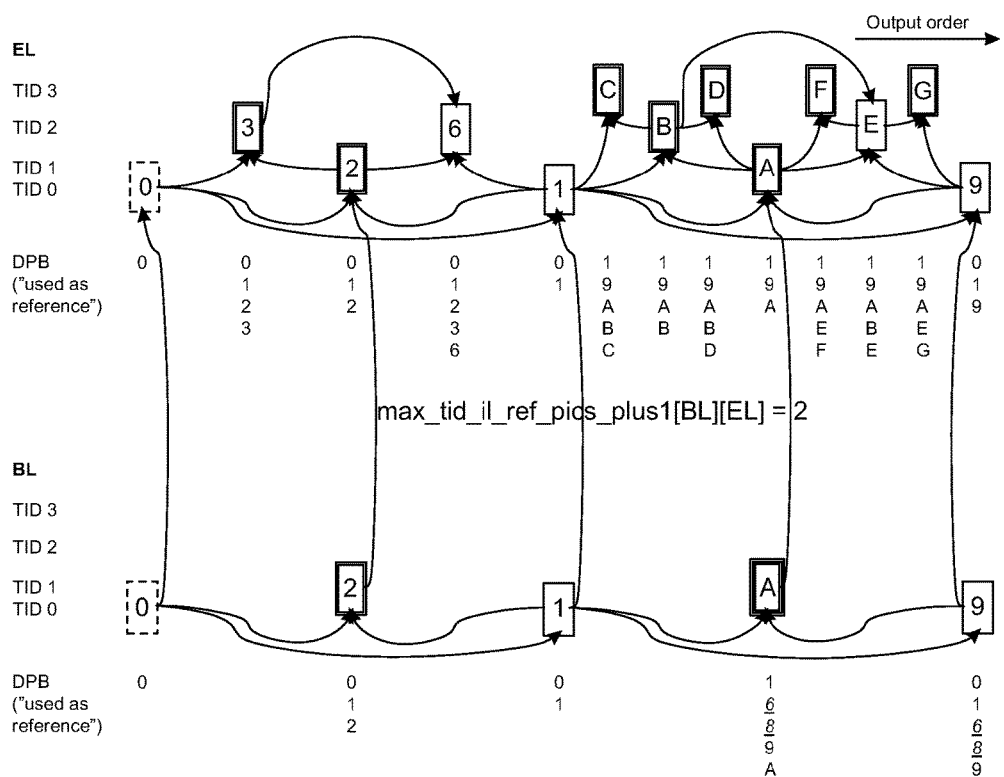
FIG. 16 illustrates a bitrate adaptation example according to yet another embodiment of the invention.

In the example of FIG. 16, it is assumed that the bitstream has been encoded such that non-aligned temporal sub-layer access pictures are encoded when only certain temporal levels are used for inter-layer prediction, as shown in the example of FIG. 10. It is further assumed that the sender is aware that the receiver uses an output layer set where only the enhancement layer is an output layer and hence the transmission of BL sub-layers that are not used as reference for inter-layer prediction is omitted. It is also assumed it has been necessary to reduce the bitrate of the first GOP when the bitstream is transmitted. In this example, the EL pictures with TemporalId in the range of 0 to 2, inclusive, are transmitted for the first GOP. It is further assumed that the bitstream can be transmitted at its full bitrate starting from the second GOP. As the second GOP in EL starts with TSA pictures, it is possible to start transmitting EL pictures with all TID values.

Figure 17:
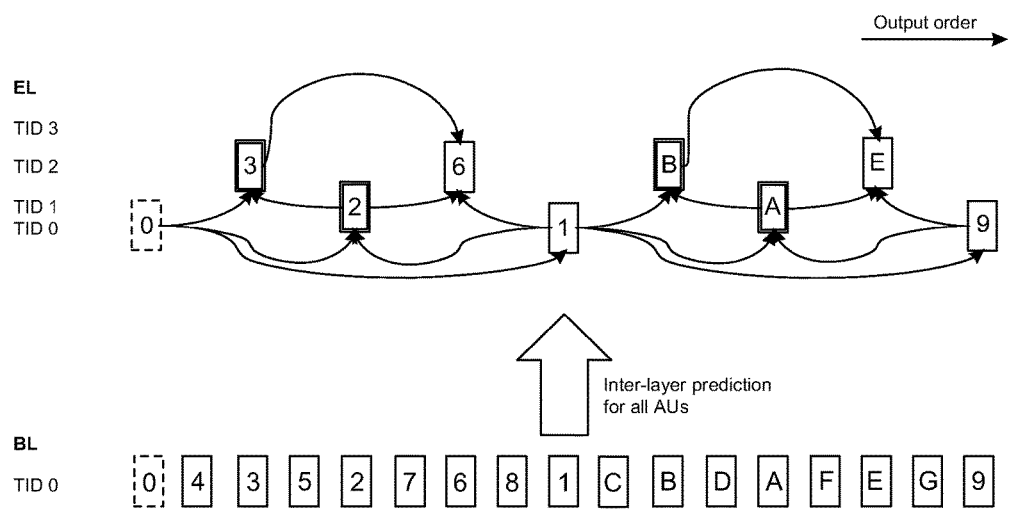
FIG. 17 illustrates a bitrate adaptation example according to yet another embodiment of the invention.

In the example of FIG. 17, it is assumed that the bitstream has been encoded such that prediction hierarchies are determined differently across layers, as shown in FIG. 11. It is further assumed that the sender adjusts the bitrate of the transmitted bitstream, whereupon the sender chooses to transmit only three sub-layers (TID 0, 1 and 2) of the EL. It is noted that if the use of alternative output layers is enabled, pictures would be output constantly at "full" picture rate in this example.

Figure 18:
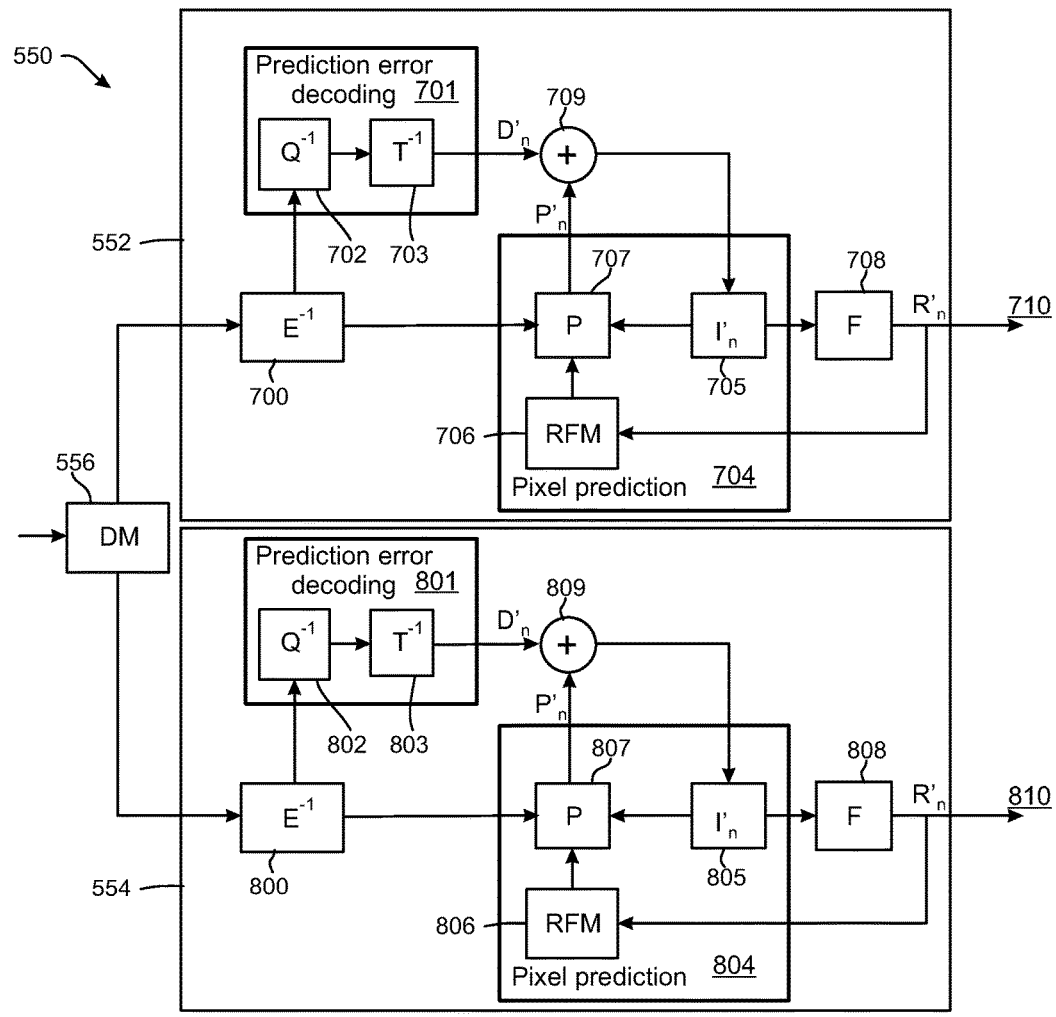
FIG. 18 shows a schematic diagram of a decoder suitable for implementing embodiments of the invention.

FIG. 18 shows a block diagram of a video decoder suitable for employing embodiments of the invention. FIG. 18 depicts a structure of a two-layer decoder, but it would be appreciated that the decoding operations may similarly be employed in a single-layer decoder.

The video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base view/non-base view components to obtain the preliminary reconstructed images (I'n). Preliminary reconstructed and filtered base view images may be output 709 from the first decoder section 552 and preliminary reconstructed and filtered base view images may be output 809 from the first decoder section 554.

Figure 20:
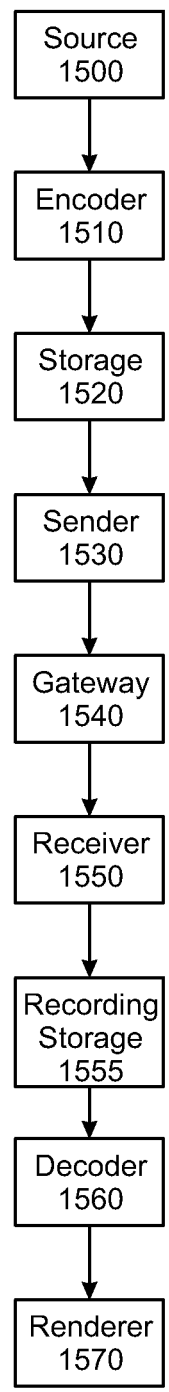
FIG. 20 shows a schematic diagram of an example multimedia communication system within which various embodiments may be implemented.

FIG. 20 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISO Base Media File Format, for encapsulation of the at least one of the contained media bitstream on the communication protocol.

The server 540 may or may not be connected to a gateway 1550 through a communication network. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 1550 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes or other devices that forward broadcast transmissions locally to home wireless networks. When RTP is used, the gateway 1550 may be called an RTP mixer or an RTP translator and may act as an endpoint of an RTP connection.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform bitrate adaptation according to various described embodiments, and/or a sender 1540 and/or a gateway 1550 may be configured to select the transmitted layers and/or sub-layers of a scalable video bitstream according to various embodiments. Bitrate adaptation and/or the selection of the transmitted layers and/or sub-layers may take place for multiple reasons, such as to respond to requests of the receiver 1560 or prevailing conditions, such as throughput, of the network over which the bitstream is conveyed. A request from the receiver can be, e.g., a request for a change of transmitted scalability layers and/or sub-layers, or a change of a rendering device having different capabilities compared to the previous one.

A decoder 1580 may be configured to perform bitrate adaptation according to various described embodiments, and/or a decoder 1580 may be configured to select the transmitted layers and/or sub-layers of a scalable video bitstream according to various embodiments. Bitrate adaptation and/or the selection of the transmitted layers and/or sub-layers may take place for multiple reasons, such as to achieve faster decoding operation. Faster decoding operation might be needed for example if the device including the decoder 580 is multi-tasking and uses computing resources for other purposes than decoding the scalable video bitstream. In another example, faster decoding operation might be needed when content is played back at a faster pace than the normal playback speed, e.g. twice or three times faster than conventional real-time playback rate.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). The SVC and MVC file formats are specified as amendments to the AVC file format. The ISO file format is the base for derivation of all the above mentioned file formats (excluding the ISO file format itself). These file formats (including the ISO file format itself) are generally called the ISO family of file formats.

The basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are enclosed in separate boxes. In an example embodiment, the media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track box. A track may be one of the following types: media, hint, timed metadata. A media track refers to samples formatted according to a media compression format (and its encapsulation to the ISO base media file format). A hint track refers to hint samples, containing cookbook instructions for constructing packets for transmission over an indicated communication protocol. The cookbook instructions may include guidance for packet header construction and include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, typically one media track is selected. Samples of a track may be implicitly associated with sample numbers that are incremented by 1 in the indicated decoding order of samples. The first sample in a track may be associated with sample number 1.

An example of a simplified file structure according to the ISO base media file format may be described as follows. The file may include the moov box and the mdat box and the moov box may include one or more tracks that correspond to video and audio, respectively.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference (dref) box, also included in each track, may define an indexed list of uniform resource locators (URLs), uniform resource names (URNs), and/or self-references to the file containing the metadata. A sample entry may point to one index of the Data Reference box, thereby indicating the file containing the samples of the respective chunk or track fragment.

Movie fragments may be used when recording content to ISO files in order to avoid losing data if a recording application crashes, runs out of memory space, or some other incident occurs. Without movie fragments, data loss may occur because the file format may typically require that all metadata, e.g., the movie box, be written in one contiguous area of the file. Furthermore, when recording a file, there may not be sufficient amount of memory space (e.g., RAM) to buffer a movie box for the size of the storage available, and re-computing the contents of a movie box when the movie is closed may be too slow. Moreover, movie fragments may enable simultaneous recording and playback of a file using a regular ISO file parser. Finally, a smaller duration of initial buffering may be required for progressive downloading, e.g., simultaneous reception and playback of a file, when movie fragments are used and the initial movie box is smaller compared to a file with the same media content but structured without movie fragments.

The movie fragment feature may enable splitting the metadata that conventionally would reside in the movie box into multiple pieces. Each piece may correspond to a certain period of time for a track. In other words, the movie fragment feature may enable interleaving file metadata and media data. Consequently, the size of the movie box may be limited and the use cases mentioned above be realized.

In some examples, the media samples for the movie fragments may reside in an mdat box, as usual, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping has a type field to indicate the type of grouping. Sample groupings are represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These are distinguished by a type field used to indicate the type of grouping.

The sample group boxes (SampleGroupDescription Box and SampleToGroup Box) reside within the sample table (stbl) box, which is enclosed in the media information (minf), media (mdia), and track (trak) boxes (in that order) within a movie (moov) box. The SampleToGroup box is allowed to reside in a movie fragment. Hence, sample grouping can be done fragment by fragment.

In an embodiment, which may applied independently of or together with other embodiments, an encoder or another entity, such as a file creator, encodes or inserts an indication of one or more layer access pictures into a container file, which may for example conform to the ISO Base Media File Format and possibly some of its derivative file formats. A sample grouping for layer access pictures may for example be specified, or layer access picture may be indicated within another more generic sample grouping, e.g. for indication random access points.

In some embodiments, a decoder or another entity, such as a media player or a file parser, decodes or fetches an indication of one or more layer access pictures into a container file, which may for example conform to the ISO Base Media File Format and possibly some of its derivative file formats. For example, the indication may be obtained from a sample grouping for layer access pictures, or from another more generic sample grouping, e.g. for indication random access points, which is also capable of indicating layer access pictures. The indication may be used to start decoding or other processing of the layer which the indication is associated with.

It needs to be understood that an access unit for scalable video coding may be defined in various ways including but not limited to the definition of an access unit for HEVC as described earlier. Embodiments may be applied with different definitions of an access unit. For example, the access unit definition of HEVC may be relaxed so that an access unit is required to include coded pictures associated with the same output time and belonging to the same layer tree. When the bitstream has multiple layer trees, an access unit may but is not required to include coded pictures associated with the same output time and belonging to different layer trees.

In the above, some embodiments have been described using MV-HEVC, SHVC and/or alike as examples, and consequently some terminology, variables, syntax elements, picture types, and so on specific to MV-HEVC, SHVC and/or alike have been used. It needs to be understood that embodiments could be realized with similar respective terminology, variables, syntax elements, picture types, and so on of other coding standards and/or methods. For example, in the above, some embodiments have been described with reference to nuh_layer_id and/or TemporalId. It needs to be understood that embodiments could be realized with any other indications, syntax elements, and/or variables for a layer identifier and/or a sub-layer identifier, respectively.

In the above, some embodiments have been described with reference to a step-wise temporal sub-layer access picture on a lowest temporal sub-layer. It needs to be understood that embodiments could be realized similarly with any type of a layer access picture that provides correct decoding capability for a subset of pictures of the layers, such as for certain but not necessarily all sub-layers of a layer.

In the above, some embodiments have been described in relation to encoding indications, syntax elements, and/or syntax structures into a bitstream or into a coded video sequence and/or decoding indications, syntax elements, and/ or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising
receiving coded pictures of a first scalability layer;
decoding the coded pictures of the first scalability layer;
receiving coded pictures of a second scalability layer, the second scalability layer depending on the first scalability layer;
selecting a layer access picture on the second scalability layer from the coded pictures of the second scalability layer, wherein the selected layer access picture is a step-wise temporal sub-layer access (STSA) picture on a lowest temporal sub-layer, wherein receiving coded pictures of the second scalability layer comprises receiving the STSA picture on the lowest sub-layer in a Supplemental Enhancement Information (SEI) message that also defines a number of sub-layers that are decodable when the decoding starts from the selected layer access picture;
ignoring coded pictures on a second scalability layer prior to, in decoding order, the selected layer access picture;
decoding the selected layer access picture; and
starting step-wise decoding of at least one enhancement layer in response to said at least one enhancement layer containing an intra random access point (IRAP) picture or an STSA picture on the lowest sub-layer, wherein starting step-wise decoding comprises:
when the current picture is a temporal sub-layer access (TSA) or STSA picture at a higher sub-layer than the lowest sub-layer and decoding of the next lower sub-layer in the same layer has been started, and decoding of the same sub-layer of all the reference layers of the TSA or STSA picture has been started, the TSA or STSA picture and all pictures at the same sub-layer following the TSA or STSA picture, in decoding order, in the same layer are decoded.

2. The method according claim 1, wherein said selecting comprises concluding that a picture is a step-wise temporal sub-layer access picture on the basis of its Network Access Layer (NAL) unit type indicating the step-wise temporal sub-layer access picture and its temporal sub-layer identifier indicating the lowest temporal sub-layer.

3. The method according to claim 1, the method further comprising
starting decoding of the bitstream in response to a base layer containing an intra random access point (IRAP) picture or a step-wise temporal sub-layer access (STSA) picture on the lowest sub-layer; and
increasing progressively the number of decoded layers and/or the number of decoded temporal sub-layers.

4. The method according to claim 3, wherein starting the step-wise decoding further comprises the following conditional operation:
when a current picture is an IRAP picture and decoding of all reference layers of the IRAP picture has been started, the IRAP picture and all pictures following it, in decoding order, in the same layer are decoded.

5. A method comprising
receiving coded pictures of a first scalability layer;
receiving coded pictures of a second scalability layer, the second scalability layer depending on the first scalability layer;
selecting a layer access picture on the second scalability layer from the coded pictures of a second scalability layer, wherein the selected layer access picture is a step-wise temporal sub-layer access picture on the lowest temporal sub-layer, wherein the step-wise temporal sub-layer access picture provides an access point for layer-wise initialization of decoding of a bitstream with one or more temporal sub-layers;
ignoring coded pictures on a second scalability layer prior to, in decoding order, the selected layer access picture;
sending the coded pictures of the first scalability layer and the selected layer access picture in a bitstream; and
signaling the step-wise temporal sub-layer access picture in a Supplemental Enhancement Information (SEI) message that also defines the number of decodable sub-layers when the decoding starts from the selected layer access picture.

6. An apparatus comprising:
at least one processor and at least one memory, said at least one memory stored with code thereon, which when executed by said at least one processor, causes an apparatus to perform at least:
receiving coded pictures of a first scalability layer;
decoding the coded pictures of the first scalability layer;
receiving coded pictures of a second scalability layer, the second scalability layer depending on the first scalability layer;
selecting a layer access picture on the second scalability layer from the coded pictures of a second scalability layer, wherein the selected layer access picture is a step-wise temporal sub-layer access (STSA) picture on the lowest temporal sub-layer, wherein receiving coded pictures of the second scalability layer comprises receiving the STSA picture on the lowest sub-layer in a Supplemental Enhancement Information (SEI) message that also defines a number of sub-layers that are decodable when the decoding starts from the selected layer access picture;
ignoring coded pictures on a second scalability layer prior to, in decoding order, the selected layer access picture;
decoding the selected layer access picture; and
starting step-wise decoding of at least one enhancement layer in response to said at least one enhancement layer containing an intra random access point (IRAP) picture or an STSA picture on the lowest sub-layer, wherein starting step-wise decoding comprises:
when the current picture is a temporal sub-layer access (TSA) or STSA picture at a higher sub-layer than the lowest sub-layer and decoding of the next lower sub-layer in the same layer has been started, and decoding of the same sub-layer of all the reference layers of the TSA or STSA picture has been started, the TSA or STSA picture and all pictures at the same sub-layer following the TSA or STSA picture, in decoding order, in the same layer are decoded.

7. An apparatus comprising:
at least one processor and at least one memory, said at least one memory stored with code thereon, which when executed by said at least one processor, causes an apparatus to perform at least receiving coded pictures of a first scalability layer;
receiving coded pictures of a second scalability layer, the second scalability layer depending on the first scalability layer;
selecting a layer access picture on the second scalability layer from the coded pictures of a second scalability layer, wherein the selected layer access picture is a step-wise temporal sub-layer access picture on the lowest temporal sub-layer, wherein the step-wise temporal sub-layer access picture provides an access point for layer-wise initialization of decoding of a bitstream with one or more temporal sub-layers;

ignoring coded pictures on a second scalability layer prior to, in decoding order, the selected layer access picture;

sending the coded pictures of the first scalability layer and the selected layer access picture in a bitstream; and signaling the step-wise temporal sub-layer access picture in a Supplemental Enhancement Information (SEI) message that also defines the number of decodable sub-layers when the decoding starts from the selected layer access picture.

8. A method comprising encoding a first picture on a first scalability layer and on a lowest temporal sub-layer;

encoding a second picture on a second scalability layer and on the lowest temporal sub-layer, wherein the first picture and the second picture represent the same time instant, encoding one or more first syntax elements, associated with the first picture, with a value indicating that a picture type of the first picture is other than a step-wise temporal sub-layer access (STSA) picture;

encoding one or more second syntax elements, associated with the second picture, with a value indicating that a picture type of the second picture is a step-wise temporal sub-layer access picture, wherein the step-wise temporal sub-layer access picture is the step-wise temporal sub-layer access picture on a lowest temporal sub-layer and provides an access point for layer-wise initialization of decoding of a bitstream with one or more temporal sub-layers;

encoding at least a third picture on a second scalability layer and on a temporal sub-layer higher than the lowest temporal sub-layer; and signaling the step-wise temporal sub-layer access picture in a Supplemental Enhancement Information (SEI) message that also defines the number of decodable sub-layers when the decoding starts from the selected layer access picture.

9. The method according to claim 8, the method further comprising signaling the step-wise temporal sub-layer access picture in the bitstream by a specific NAL unit type.

10. The method according to claim 8, the method further comprising encoding said second or any further scalability layer to comprise more frequent TSA or STSA pictures than the first scalability layer.

11. An apparatus comprising:

at least one processor and at least one memory, said at least one memory stored with code thereon, which when executed by said at least one processor, causes an apparatus to perform at least:

encoding a first picture on a first scalability layer and on a lowest temporal sub-layer;

encoding a second picture on a second scalability layer and on the lowest temporal sub-layer, wherein the first picture and the second picture represent the same time instant, encoding one or more first syntax elements, associated with the first picture, with a value indicating that a picture type of the first picture is other than a step-wise temporal sub-layer access picture;

encoding one or more second syntax elements, associated with the second picture, with a value indicating that a picture type of the second picture is a step-wise temporal sub-layer access picture, wherein the step-wise temporal sub-layer access picture is the step-wise temporal sub-layer access picture on a lowest temporal sub-layer and provides an access point for layer-wise initialization of decoding of a bitstream with one or more temporal sub-layers;

encoding at least a third picture on a second scalability layer and on a temporal sub-layer higher than the lowest temporal sub-layer; and signaling the step-wise temporal sub-layer access picture in a Supplemental Enhancement Information (SEI) message that also defines the number of decodable sub-layers when the decoding starts from the selected layer access picture.

12. The apparatus according to claim 11, further comprising code causing the apparatus to perform signaling the step-wise temporal sub-layer access picture in the bitstream by a specific NAL unit type.

13. The apparatus according to claim 11, further comprising code causing the apparatus to perform encoding said second or any further scalability layer to comprise more frequent TSA or STSA pictures than the first scalability layer.

14. A non-transitory computer readable storage medium stored with code thereon for use by an apparatus, which when executed by a processor, causes the apparatus to perform:

encoding a first picture on a first scalability layer and on a lowest temporal sub-layer;

encoding a second picture on a second scalability layer and on the lowest temporal sub-layer, wherein the first picture and the second picture represent the same time instant, encoding one or more first syntax elements, associated with the first picture, with a value indicating that a picture type of the first picture is other than a step-wise temporal sub-layer access picture;

encoding one or more second syntax elements, associated with the second picture, with a value indicating that a picture type of the second picture is a step-wise temporal sub-layer access picture, wherein the step-wise temporal sub-layer access picture is the step-wise temporal sub-layer access picture on a lowest temporal sub-layer and provides an access point for layer-wise initialization of decoding of a bitstream with one or more temporal sub-layers;

encoding at least a third picture on a second scalability layer and on a temporal sub-layer higher than the lowest temporal sub-layer; and signaling the step-wise temporal sub-layer access picture in a Supplemental Enhancement Information (SEI) message that also defines the number of decodable sub-layers when the decoding starts from the selected layer access picture.

* * * * *